(12) United States Patent
Yamamoto et al.

(10) Patent No.: US 7,172,642 B2
(45) Date of Patent: Feb. 6, 2007

(54) MAGNETIC METAL PARTICLES CONTAINING IRON AS MAIN COMPONENT, PROCESS FOR PRODUCING THE SAME AND MAGNETIC RECORDING MEDIUM USING THE SAME

(75) Inventors: Akinori Yamamoto, Hatsukaichi (JP); Yasutaka Ota, Onoda (JP); Haruki Kurokawa, Hiroshima (JP); Masaaki Maekawa, Hiroshima (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 202 days.

(21) Appl. No.: 10/305,353

(22) Filed: Nov. 27, 2002

(65) Prior Publication Data
US 2003/0136473 A1 Jul. 24, 2003

(30) Foreign Application Priority Data
Dec. 4, 2001 (JP) ............................. 2001-370686

(51) Int. Cl.
*B22F 1/00* (2006.01)
*B22F 9/20* (2006.01)
*H01F 1/16* (2006.01)

(52) U.S. Cl. ...................... 75/255; 75/363; 148/105; 148/306; 252/62.54; 428/693.1

(58) Field of Classification Search ................ 75/255; 148/105, 306; 428/694 R, 693.1; 252/62.54
See application file for complete search history.

(56) References Cited

U.S. PATENT DOCUMENTS

| 5,466,306 | A |  | 11/1995 | Mishima et al. |
| 5,735,969 | A |  | 4/1998 | Lown et al. |
| 6,299,973 | B1 | * | 10/2001 | Hayashi et al. ............. 428/323 |
| 6,663,939 | B1 | * | 12/2003 | Sasaki ........................ 428/141 |

FOREIGN PATENT DOCUMENTS

| EP | 0827137 A | 3/1998 |
| EP | 0999185 A | 5/2000 |
| EP | 1065675 A | 1/2001 |

* cited by examiner

Primary Examiner—Ngoclan T. Mai
(74) Attorney, Agent, or Firm—Nixon & Vanderhye P.C.

(57) ABSTRACT

Magnetic metal particles containing iron as a main component, comprising cobalt in an amount of usually 20 to 50 atm %, calculated as Co, based on whole Fe, aluminum in an amount of usually 3 to 15 atm %, calculated as Al, based on whole Fe and a rare earth element in an amount of usually 3 to 20 atm %, calculated as rare earth element, based on whole Fe, and having an average major axis diameter of usually 0.02 to 0.065 μm, preferably from 0.02 to less than 0.05 μm, a coercive force of usually 159.2 to 222.9 kA/m (2,000 to 2,800 Oe), a soluble Na content of usually not more than 30 ppm, a soluble Ca content of usually not more than 100 ppm, and an oxidation stability $\Delta\sigma s$ of usually not more than 10%.

15 Claims, No Drawings

MAGNETIC METAL PARTICLES CONTAINING IRON AS MAIN COMPONENT, PROCESS FOR PRODUCING THE SAME AND MAGNETIC RECORDING MEDIUM USING THE SAME

BACKGROUND OF THE INVENTION

The present invention relates to magnetic metal particles containing iron as a main component, a process for producing the same and a magnetic recording medium using the same, and more particularly, to magnetic metal particles containing iron as a main component which have a high coercive force, a more excellent oxidation stability and a less soluble salt content in spite of fine particles having an average major axis diameter as small as 0.02 to 0.08 μm, a process for producing the magnetic metal particles, and a magnetic recording medium using the magnetic metal particles.

In recent years, miniaturization, lightening, recording-time prolongation and high-density recording as well as increase in memory capacity in magnetic recording and reproducing apparatuses for audio, video or computer have proceeded more rapidly. With such a recent tendency, it has been increasingly required to provide magnetic recording media having a high performance and a high-density recording property, such as magnetic tapes and magnetic disks.

Namely, the magnetic recording media have been required to have high image definition and quality, high output characteristics such as, in particular, good frequency characteristics, an excellent keeping property and a high durability. For this reason, it has been required that the magnetic recording media are reduced in noise due to the magnetic recording media themselves, and exhibit a high coercive force Hc, a narrow coercive force distribution (Switching Field Distribution: SFD) and an excellent weather resistance ΔBm.

These properties of the magnetic recording media have a close relation to magnetic particles used therein. In recent years, magnetic metal particles containing iron as a main component have been noticed because the magnetic metal particles can show a higher coercive force and a larger saturation magnetization σs as compared to those of conventional magnetic iron oxide particles, and have been already used as magnetic particles for magnetic recording media such as digital audio tapes (DAT), 8-mm video tapes, Hi-8 tapes, W-VHS tapes for Hi-Vision, DVC tapes of digital recording type, etc., as well as removable disks for computers such as Zip disks and Super disks. Further, it has been recently attempted to practically apply the magnetic metal particles containing iron as a main component to large-capacity Hi-FD.

Therefore, it has also been strongly required to improve properties of the magnetic metal particles containing iron as a main component.

More specifically, in order to obtain magnetic recording media satisfying various properties mentioned above, the magnetic metal particles containing iron as a main component which are used as magnetic particles therein, have been strongly required to be in the form of fine particles, and to exhibit a higher coercive force, an excellent oxidation stability Δσs and a lessened soluble salt content.

As to the reduction in particle size of the magnetic metal particles, in Japanese Patent Application Laid-Open (KOKAI) No. 2000-251243, it is described that " . . . In order to achieve a high recording density of magnetic recording media, it has been intensively required to shorten the wavelength of signals to be recorded thereon. When the size of a magnetic material used becomes as large as that compatible with a length of a recording region for signals, a clear magnetization transition region is no longer available, so that it becomes substantially impossible to record signals thereon. For this reason, it has been longtime demanded to provide the magnetic material in the form of fine particles for achieving high-density recording upon use.". Thus, in order to obtain magnetic recording media having a high output characteristics in a short wavelength region as well as a lessened noise, it is necessary to reduce the particle size of the magnetic metal particles, i.e., reduce the major axis diameter thereof to obtain fine particles.

Also, in recent years, it has been attempted to use a magneto resistance-type head as a reproduction head for computer tapes instead of conventional induction-type magnetic heads. The magneto resistance-type head can readily produce a considerably high reproduction output as compared to the conventional induction-type magnetic heads, and is free from impedance noise due to use of induction coil. Therefore, the use of the magneto resistance-type head contributes to reduction in a system noise to a large extent. If such noises due to magnetic recording media themselves are reduced, it will be possible to attain a high C/N ratio. Accordingly, in order to reduce such magnetic recording media noises, in particular, noises due to particles, it has been required to further reduce the particle size of the magnetic metal particles used therein.

On the other hand, the coercive force of the magnetic particles is generally produced due to shape anisotropy thereof. Therefore, in order to obtain magnetic particles having a high coercive force, it is required to increase an aspect ratio (average major axis diameter/average minor axis diameter) of the particles. However, since the aspect ratio of the magnetic particles tends to be lowered in proportion to reduction in particle size thereof, it may be difficult to obtain fine magnetic metal particles having a high coercive force. As to this face, in Japanese Patent Application Laid-Open (KOKAI) No. 10-83906(1998), it is described that " . . . the coercive force of the above metal particles generally has a close relation to the size thereof. As the particles become finer, it is more difficult to maintain a high coercive force thereof. For example, if the minor axis diameter of acicular particles is kept constant, the coercive force thereof increases in proportion to the aspect ratio (major axis diameter/minor axis diameter) thereof. . . In order to achieve not only high coercive force but also high output in a short wavelength region, since the increase of major axis diameter of the particles is limited, only a way for increasing the aspect ratio and achieving a high coercive force is to shorten the minor axis diameter of the particles. However, it is known that when the minor axis diameter of the particles becomes too small, a so-called super paramagnetism occurs, thereby failing to show a coercive force. Thus, the reduction of minor axis diameter of the particles is also limited . . . ".

It is also known that the reduction in particle size of the magnetic metal particles is accompanied with reduction of the minor axis diameter and crystallite size thereof and, therefore, increase of a specific surface area thereof, so that it is very difficult to maintain a high oxidation stability. Since the oxidation stability of the magnetic metal particles largely contributes to keeping property and durability of the resultant magnetic recording media, it has been strongly required to provide magnetic metal particles exhibiting a high oxidation stability in spite of fine particles.

In particular, with the recent tendency of reduction in noises of magnetic recording media, the magnetic metal particles used therein have been increasingly reduced in particle size. However, when the particle size of the magnetic metal particles is reduced to less than 0.05 μm, the surface activity thereof becomes remarkably high as compared to that of magnetic metal particles having a particle size of not less than 0.05 μm, so that the magnetic metal particles tend to be readily oxidized in air, resulting in significant deterioration in magnetic properties thereof with the passage of time. As a result, conventionally, as means for achieving a high C/N ratio by reducing noises due to magnetic recording media themselves, a person skilled in the art has been hardly motivated to use the magnetic metal particles having a particle size of less than 0.05 μm as magnetic particles for magnetic recording media.

On the other hand, the magnetic metal particles contain various impurities such as alkali metals due to production processes thereof.

Namely, the magnetic metal particles containing iron as a main component can be produced by using, as starting particles, (i) goethite particles obtained by passing an oxygen-containing gas such as air through a water suspension containing an iron-containing precipitate obtained by reacting an aqueous ferrous salt solution containing ferrous sulfate or the like with an aqueous alkali solution containing alkali salt such as sodium hydroxide and sodium carbonate, to conduct an oxidation reaction thereof, (ii) hematite particles obtained by heat-dehydrating the goethite particles, or (iii) particles obtained by incorporating different kinds of elements other than iron into these particles; and heat-reducing the starting particles under a reducing gas atmosphere.

Owing to the above production processes, the magnetic metal particles contain soluble sodium salt and sulfate ions as well as soluble calcium salt inevitably introduced during the production processes. When such magnetic metal particles containing the soluble sodium salt, the soluble calcium salt or the sulfate ions are used as magnetic particles for magnetic recording media, there arises such a problem that compounds derived from these soluble salts are precipitated on a magnetic coating film or a magnetic head. As to this fact, in Japanese Patent Application Laid-Open (KOKAI) No. 9-305958(1997), it is described that "when the total amount of water-soluble ions contained in magnetic materials, non-magnetic materials, carbon black and fillers used in the respective layers exceeded a certain amount, there was recognized such a phenomenon that the obtained magnetic tape suffered from increase in friction coefficient upon running the tape after stored under high-temperature and high-humidity conditions, and in extreme cases, the magnetic tape caused a "stuck" phenomenon and stopped. In still worse cases, solids precipitated on the magnetic tape cause a spacing loss, thereby deteriorating reproduction output of the magnetic tape. Further, the magnetic metal head is severely corroded, resulting in deteriorated recording and reproducing characteristics".

Namely, in the case of the magnetic recording media produced by using fine magnetic metal particles not subjected to any treatment for reducing soluble salts thereof, for example, "magnetic recording media comprising a non-magnetic substrate; at least one undercoat formed on the non-magnetic substrate and composed of a binder and non-magnetic particles dispersed therein; and a magnetic layer formed as an uppermost layer on the undercoat and composed of a binder and ferromagnetic particles dispersed therein, which have an average major axis diameter of 0.01 to 0.06 μm, a crystallite size of 10 to 150 Å and an acicular ratio of 2:1 to 15:1, wherein the magnetic layer contains non-combustible components in an amount of 80 to 95%" as described in Japanese Patent Application Laid-Open No. 9-63040(1997), since the magnetic metal particles are not subjected to any treatment for reducing the soluble salts contained therein, compounds derived from the soluble salts contained in the magnetic metal particles tend to be eluted from the magnetic metal particles, then precipitated on the magnetic coating film, and adhered onto the magnetic head, resulting in spacing loss due to the precipitate. As a result, there may arise problems such as deteriorated reproduction output of magnetic tapes, corrosion of the metal head and deteriorated recording and reproducing characteristics.

In order to reduce amounts of the soluble salts contained in the magnetic metal particles, there may be used either 1) a method of producing the magnetic metal particles without using any aqueous alkali solution containing alkali metal salts such as sodium hydroxide, or 2) a method of removing the soluble salts from the particles by washing the particles with water.

As the method of removing the soluble salts from the particles by washing the particles with water, it may be considered that the intermediate product obtained in each stage of the production process of the magnetic metal particles is washed with water. However, in the production process of the magnetic metal particles, even though the goethite particles or hematite particles as starting particles at each stage are washed with water, only soluble salts present on the surface of the particles are removed. For this reason, even though such water-washed starting particles are subjected to reduction reaction to produce the magnetic metal particles, insoluble impurities contained within the particles are moved to the surface thereof, and are precipitated thereon in the form of corresponding soluble salts. Thus, it is impossible to completely remove these soluble salts from the magnetic metal particles. On the other hand, when the obtained magnetic metal particles are washed with water, the thus washed magnetic metal particles, especially spindle-shaped magnetic metal particles, tend to be deteriorated in magnetic properties such as coercive force as well as dispersibility in magnetic coating composition.

Thus, in the above-described conventional methods of removing the soluble salts by water-washing, although the soluble salt content is reduced to some extent, it may be difficult to completely remove the soluble salts from the particles, i.e., reduce the soluble salt content to zero. In addition, the conventional methods lead to deteriorated magnetic properties of the obtained particles. Under this circumstance, it has been required to minimize residual impurities contained in the particles by avoiding use of the aqueous alkali solution containing alkali metal salts such as sodium hydroxide, thereby producing high-purity magnetic metal particles.

Hitherto, there have been proposed methods for producing goethite particles without using any aqueous alkali solution containing alkali metals, or methods for water-washing hematite particles obtained by heat-dehydrating the goethite particles as well as the finally obtained magnetic metal particles (Japanese Patent Application Laid-Open (KOKAI) Nos. 61-174119(1986), 7-22224(1995), 7-326035 (1995), 8-7256(1996), 8-185624(1996), 8-186015(1996), 8-279137(1996), 8-279138(1996), 8-306031(1996), 9-106535(1997), 9-305958(1997), 10-69629(1998), 10-83906(1998), 2001-81506 and 2001-176052, WO00/38201, Japanese Patent Application Laid-Open (KOKAI) No. 2001-192211, etc.).

At present, it has been strongly required to provide magnetic metal particles containing iron as a main component, which can show a high coercive force, an excellent oxidation stability and a less soluble salt content in spite of fine particles. However, the conventional methods have failed to obtain such magnetic metal particles containing iron as a main component which are capable of fully satisfying various properties mentioned above.

Namely, in Japanese Patent Application Laid-Open (KOKAI) No. 61-174119(1986), there is described the method of producing goethite particles by using an aqueous ammonium carbonate solution together with an aqueous ferrous sulfate solution. However, since the obtained goethite particles contain no cobalt, magnetic metal particles produced from such goethite particles as starting particles may fail to show a sufficient oxidation stability.

Also, in Japanese Patent Application Laid-Open (KOKAI) No. 7-22224(1995), it is described that hematite particles or magnetic metal particles are washed with water. However, the obtained magnetic metal particles have a major axis diameter of not less than 0.08 μm and a coercive force of not more than 2,000 Oe. Therefore, the obtained particles fail to fulfill requirements such as reduction in particle size and enhancement of coercive force.

In Japanese Patent Application Laid-Open (KOKAI) Nos. 7-326035(1995) and 8-7256(1996), there is described the method of producing magnetic metal particles from goethite particles obtained by using an aqueous ferrous salt solution, ammonium carbonate and aqueous ammonia. However, the obtained magnetic metal particles have an average major axis diameter as large as not less than 0.08 μm, and, therefore, also fail to fulfill requirements such as reduction in particle size and enhancement of coercive force.

In Japanese Patent Application Laid-Open (KOKAI) No. 8-185624(1996), it is described that hematite particles or magnetic metal particles are washed with water to control the ratio between sodium ions and potassium ions contained therein to a specific range. However, the obtained magnetic metal particles have an average major axis diameter as large as about 0.13 μm and a soluble sodium content as large as 200 ppm or lower, and, therefore, also fail to fulfill requirements such as reduction in particle size, enhancement of coercive force and improvement in oxidation stability.

Also, in Japanese Patent Application Laid-Open (KOKAI) Nos. 8-279137(1996) and 8-306031(1996), there is described the method of producing magnetic metal particles from goethite particles obtained by using an aqueous ferrous salt solution, ammonium carbonate and aqueous ammonia. The obtained magnetic metal particles have an average major axis diameter of 0.05 to 0.13 μm, and the surface layer portion thereof is higher in contents of aluminum, rare earth element and oxygen than those of whole particles. However, since an aluminum compound is added after completing the production reaction of the goethite particles and water-washing the goethite particles, no aluminum is contained within crystals of the goethite particles. Therefore, the reducing velocity upon the heat-reduction treatment is not sufficiently controlled, resulting in acceleration of sintering. As a result, the obtained particles fail to provide fine magnetic metal particles exhibiting excellent magnetic properties and oxidation stability.

In Japanese Patent Application Laid-Open (KOKAI) No. 9-106535(1998), there is described the method of producing magnetic metal particles from goethite particles obtained by using an aqueous ferrous salt solution, ammonium carbonate and aqueous ammonia. However, the obtained magnetic metal particles have a major axis diameter of 0.03 to 0.08 μm and a coercive force of 1,900 to 2,400 Oe, and also, fail to provide particles having an excellent oxidation stability.

In Japanese Patent Application Laid-Open (KOKAI) No. 9-305958(1997), it is described that the method of producing magnetic metal particles from goethite particles produced by using alkali carbonate containing no alkali metals, and further washing respective intermediate particles before producing the magnetic metal particles as final product with water in order to reduce a water-soluble ion content in the magnetic metal particles. However, since compounds containing alkali metals are used as additives, the obtained goethite particles still contain alkali metals and, therefore, fail to provide high purity goethite particles.

In Japanese Patent Application Laid-Open (KOKAI) No. 10-69629(1998), there is described the method of washing either goethite particles, hematite particles or magnetic metal particles with water. However, when the water-washed goethite particles or hematite particles are subjected to reduction reaction to produce the magnetic metal particles, insoluble impurities contained within these starting particles are moved onto the surface of the resultant magnetic metal particles, and precipitated thereon in the form of corresponding soluble salts. Thus, this method also fails to provide high purity goethite particles. On the other hand, when the magnetic metal particles are washed with water, the resultant particles tend to be deteriorated in magnetic properties such as saturation magnetization and coercive force as well as dispersibility in magnetic coating composition. Therefore, the resultant magnetic metal particles fail to show excellent magnetic properties.

In Japanese Patent Application Laid-Open (KOKAI) No. 10-83906(1998), there is described the method of producing goethite particles from ferrous chloride, alkali hydroxide composed of aqueous ammonia, and alkali carbonate such as ammonium carbonate. In this method, the particles are not washed with aqueous ammonia. Further, since the production reaction of the goethite particles is conducted at a high pH value, cobalt ions are eluted out in the form of an ammine complex. As a result, it may be difficult to obtain magnetic metal particles having a high coercive force.

In Japanese Patent Application Laid-Open (KOKAI) No. 9-171914(1997), there is described the method of producing magnetic metal particles by coating with a compound containing at least one element selected from the group consisting of Co, Al, Si and Ca together with a rare earth compound the surface of goethite particles; washing the goethite particles with water; coating with a carbon compound the surface of the goethite particles as an outermost layer; and then subjecting the thus treated goethite particles to heat-dehydration and reduction reaction. However, since cobalt and aluminum do not form a solid solution in the goethite particles, the obtained magnetic metal particles fail to show sufficient magnetic properties. In addition, although the goethite particles coated with the compound containing at least one element selected from the group consisting of Co, Al, Si and Ca and the rare earth compound is washed with water, when such goethite particles are subjected to reduction reaction to produce magnetic metal particles, insoluble impurities contained within the particles are moved to the surface thereof and precipitated thereon in the form of corresponding soluble salts. Therefore, the obtained goethite particles fail to provide high purity magnetic metal particles.

In Japanese Patent Application Laid-Open (KOKAI) No. 2001-81506, there is described the method of producing magnetic metal particles by coating with rare earth element and Si the surface of Co-containing iron oxide hydroxide or iron oxide particles, in which Al forms a solid solution, and then reducing the obtained particles with a reducing gas.

However, the obtained magnetic metal particles have an average major axis diameter as large as 0.10 μm and, therefore, fail to fulfill the requirements such as reduction in particle size and enhancement of coercive force.

In Japanese Patent Application Laid-Open (KOKAI) Nos. 2001-176052 and 2001-176053, there is described the method of producing magnetic metal particles from goethite particles obtained by using an aqueous ferrous salt solution, ammonium carbonate and aqueous ammonia. However, since a cobalt compound is added only after completing the production reaction of goethite particles, it is not possible to obtain goethite particles in which cobalt is incorporated into goethite crystals. Therefore, in this method, it is considered that the reducing velocity upon the heat-reduction treatment is not sufficiently controlled, resulting in acceleration of sintering. As a result, the obtained magnetic metal particles fail to provide fine particles showing excellent magnetic properties and oxidation stability.

In WO00/38201, there is described the method of producing magnetic metal particles by mixing an aqueous ferric salt solution, an aqueous cobalt salt solution and water-soluble aluminum salt with an aqueous sodium hydroxide solution; aging the mixture to obtain iron oxide hydroxide particles containing cobalt and aluminum; coating the surface of the iron oxide hydroxide particles with a rare earth compound; and then heat-reducing the thus coated iron oxide hydroxide particles. However, when the iron oxide hydroxide particles obtained by using sodium hydroxide as an alkali source are subjected to reduction reaction to produce magnetic metal particles, insoluble impurities contained within the particles are moved onto the surface thereof, and precipitated thereon in the form of corresponding soluble salts. Therefore, the obtained particles fail to be sufficiently reduced in soluble salt content such as soluble Na salt content.

In Japanese Patent Application Laid-Open (KOKAI) No. 2001-192211, there is described the method of producing magnetic metal particles having an average major axis diameter of 0.05 to 0.2 μm from goethite particles obtained by using an aqueous ferrous salt solution, ammonium carbonate and aqueous ammonia. However, in this method, since the cobalt compound and rare earth compound are simultaneously coated on the surface of the goethite particles, a sufficient anti-sintering effect cannot be attained upon the reduction treatment. Therefore, it may be difficult to obtain magnetic metal particles in the form of fine particles which have an average major axis diameter of from 0.02 to less than 0.05 μm, a high coercive force and an excellent oxidation stability.

Therefore, it has been required to provide magnetic metal particles in the form of fine particles having an average major axis diameter as small as 0.02 to 0.05 μm and exhibiting an excellent oxidation stability as well as such a high purity that the content of residual impurities is close to zero.

As a result of the present inventors' earnest studies for solving the above problems, it has been found that by reacting an aqueous ferrous sulfate solution with a mixed aqueous alkali solution composed of an aqueous ammonium hydrogen carbonate solution in an amount of 1.7 to 3.0 equivalents based on equivalent of the aqueous ferrous sulfate solution and an aqueous ammonium hydroxide solution in an amount of 55 to 85 mol % based on the mixed aqueous alkali solution, to obtain a water suspension containing a ferrous-containing precipitate;

aging the water suspension containing the ferrous-containing precipitate in a non-oxidative atmosphere;

adding a Co compound in an amount of 10 to 35 atm % (calculated as Co) based on whole Fe, to the water suspension containing the ferrous-containing precipitate during the aging;

passing an oxygen-containing gas through the water suspension containing the ferrous-containing precipitate to conduct an oxidation reaction thereof until 20 to 80% of whole $Fe^{2+}$ is oxidized, to produce goethite seed crystal particles;

upon growing a goethite layer on the surface of the goethite seed crystal particles by passing an oxygen-containing gas through the water suspension containing the goethite seed crystal particles and the ferrous-containing precipitate, adding an Al compound in an amount of 3 to 15 atm % (calculated as Al) based on whole Fe, to the water suspension containing the goethite seed crystal particles and the ferrous-containing precipitate so as to adjust a pH value of the water suspension to less than 9.0, thereby producing goethite particles;

after filtering out the thus produced goethite particles from the water suspension, washing the goethite particles with aqueous ammonia having a pH value of 9.5 to 11.5 to obtain goethite particles;

adding a cobalt compound and alkali carbonate to a water dispersion containing the goethite particles to form a cobalt carbonate coat in an amount of 10 to 25 atm % (calculated as Co) based on whole Fe on the surface of the goethite particles;

adding a rare earth compound to the water dispersion to form a rare earth compound coat in an amount of 3 to 20 atm % (calculated as rare earth element) based on whole Fe on the surface of the cobalt carbonate coat; and heat-reducing either the surface-coated goethite particles or hematite particles obtained by heat-treating the surface-coated goethite particles at a temperature of 400 to 750° C. in a non-reducing atmosphere, at a temperature of 350 to 700° C. in a reducing atmosphere, the thus obtained magnetic metal particles containing iron as a main component can exhibit a high coercive force, an excellent oxidation stability and a less soluble salt content in spite of fine particles. The present invention has been attained on the basis of this finding.

SUMMARY OF THE INVENTION

It is an object of the present invention to provide magnetic metal particles containing iron as a main component which can exhibit a high coercive force, an excellent oxidation stability and a less soluble salt content in spite of fine particles having an average major axis diameter of usually 0.02 to 0.065 μm, preferably from 0.02 to less than 0.05 μm.

It is another object of the present invention to provide a process for producing magnetic metal particles containing iron as a main component which can exhibit a high coercive force, an excellent oxidation stability and a less soluble salt content in spite of fine particles having an average major axis diameter of 0.02 to 0.08 μm.

It is other object of the present invention to provide a magnetic recording medium exhibiting a high coercive force, an excellent squareness, and an excellent SFD, an excellent oxidation stability and a lessened noise.

To accomplish the aims, in a first aspect of the present invention, there is provided magnetic metal particles containing iron as a main component, comprising cobalt in an amount of 20 to 50 atm %, calculated as Co, based on whole Fe, aluminum in an amount of 3 to 15 atm %, calculated as Al, based on whole Fe and a rare earth element in an amount of 3 to 20 atm %, calculated as rare earth element, based on whole Fe, and having an average major axis diameter of 0.02 to 0.065 μm, a coercive force of 159.2 to 222.9 kA/m (2,000 to 2,800 Oe), a soluble Na content of not more than 30 ppm, a soluble Ca content of not more than 100 ppm, and an oxidation stability Δσs of not more than 10%.

In a second aspect of the present invention, there is provided magnetic metal particles containing iron as a main component, comprising cobalt in an amount of 20 to 50 atm %, calculated as Co, based on whole Fe, aluminum in an amount of 3 to 15 atm %, calculated as Al, based on whole Fe and a rare earth element in an amount of 3 to 20 atm %, calculated as rare earth element, based on whole Fe, and having an average major axis diameter of from 0.02 to less than 0.05 μm, a coercive force of 159.2 to 222.9 kA/m (2,000 to 2,800 Oe), a soluble Na content of not more than 30 ppm, a soluble Ca content of not more than 100 ppm, and an oxidation stability Δσs of not more than 10%.

In a third aspect of the present invention, there is provided magnetic metal particles containing iron as a main component, comprising cobalt in an amount of 20 to 50 atm %, calculated as Co, based on whole Fe, aluminum in an amount of 3 to 15 atm %, calculated as Al, based on whole Fe, and a rare earth element in an amount of 3 to 20 atm %, calculated as rare earth element, based on whole Fe, and having an average major axis diameter of from 0.02 to less than 0.05 μm, a coercive force of 159.2 to 222.9 kA/m (2,000 to 2,800 Oe), a soluble Na content of not more than 30 ppm, a soluble Ca content of not more than 100 ppm, an oxidation stability Δσs of not more than 10%, an aspect ratio of not less than 3:1, and a crystallite size $D_{110}$ of 90 to 150 Å.

In a forth aspect of the present invention, there is provided magnetic metal particles containing iron as a main component, comprising cobalt in an amount of 20 to 50 atm %, calculated as Co, based on whole Fe, aluminum in an amount of 3 to 15 atm %, calculated as Al, based on whole Fe, and a rare earth element in an amount of 3 to 20 atm %, calculated as rare earth element, based on whole Fe, and having an average major axis diameter of 0.02 to 0.065 μm, a coercive force of 159.2 to 222.9 kA/m (2,000 to 2,800 Oe), a soluble Na content of not more than 30 ppm, a soluble Ca content of not more than 100 ppm, an oxidation stability Δσs of not more than 10%, an aspect ratio of not less than 3:1, and a crystallite size $D_{110}$ of 90 to 150 Å, and
    produced by heat-reducing either goethite particles containing aluminum in an amount of 3 to 15 atm %, calculated as Al, based on whole Fe and cobalt in an amount of 10 to 35 atm %, calculated as Co, based on whole Fe which have a cobalt carbonate coat formed on surface thereof in an amount of 10 to 25 atm %, calculated as Co, based on whole Fe, and a rare earth compound coat formed on surface of the cobalt carbonate coat in an amount of 3 to 15 atm %, calculated as rare earth element, based on whole Fe, or hematite particles obtained by heat-treating the goethite particles.

In a fifth aspect of the present invention, there is provided a process for producing magnetic metal particles containing iron as a main component, comprising cobalt in an amount of 20 to 50 atm %, calculated as Co, based on whole Fe, aluminum in an amount of 3 to 15 atm %, calculated as Al, based on whole Fe and a rare earth element in an amount of 3 to 20 atm %, calculated as rare earth element, based on whole Fe, and having an average major axis diameter of 0.02 to 0.08 μm, a coercive force of 159.2 to 222.9 kA/m (2,000 to 2,800 Oe), a soluble Na content of not more than 30 ppm, a soluble Ca content of not more than 100 ppm, and an oxidation stability Δσs of not more than 10%, which process comprises:

reacting an aqueous ferrous sulfate solution with a mixed aqueous alkali solution composed of an aqueous ammonium hydrogen carbonate solution in an amount of 1.7 to 3.0 equivalents based on equivalent of the aqueous ferrous sulfate solution and an aqueous ammonium hydroxide solution in an amount of 55 to 85 mol % based on the mixed aqueous alkali solution, to obtain a water suspension containing a ferrous-containing precipitate;

aging the water suspension containing the ferrous-containing precipitate in a non-oxidative atmosphere;

adding a Co compound in an amount of 10 to 35 atm %, calculated as Co, based on whole Fe, to the water suspension containing the ferrous-containing precipitate during the aging;

passing an oxygen-containing gas through the water suspension containing the ferrous-containing precipitate to conduct an oxidation reaction thereof until 20 to 80% of whole $Fe^{2+}$ is oxidized, to produce goethite seed crystal particles;

upon growing a goethite layer on surface of the goethite seed crystal particles by passing an oxygen-containing gas through the water suspension containing the goethite seed crystal particles and the ferrous-containing precipitate, adding an aluminum compound in an amount of 3 to 15 atm %, calculated as Al, based on whole Fe, to the water suspension containing the goethite seed crystal particles and the ferrous-containing precipitate to adjust a pH value of the water suspension to less than 9.0, thereby producing goethite particles;

after filtering out the thus produced goethite particles from the water suspension, washing the goethite particles with aqueous ammonia having a pH value of 9.5 to 11.5 to obtain goethite particles;

adding a cobalt compound and alkali carbonate to a water dispersion containing the goethite particles to form a cobalt carbonate coat in an amount of 10 to 25 atm %, calculated as Co, based on whole Fe, on surface of the goethite particles;

adding a rare earth compound to the water suspension to form a rare earth compound coat in an amount of 3 to 20 atm %, calculated as rare earth element, based on whole Fe, on surface of the cobalt carbonate coat; and heat-reducing either the surface-coated goethite particles or hematite particles obtained by heat-treating the surface-coated goethite particles at a temperature of 400 to 750° C. in a non-reducing atmosphere, at a temperature of 350 to 700° C. in a reducing atmosphere.

In a sixth aspect of the present invention, there is provided a magnetic recording medium, comprising:

a non-magnetic base film; and a magnetic recording layer formed on the non-magnetic base film, comprising a binder resin and magnetic metal particles containing iron as a main component, comprising cobalt in an amount of 20 to 50 atm %, calculated as Co, based on whole Fe, aluminum in an amount of 3 to 15 atm %, calculated as Al, based on whole Fe and a rare earth element in an amount of 3 to 20 atm %, calculated as rare earth element, based on whole Fe, and having an average major axis diameter of 0.02 to 0.065 μm, a coercive force of 159.2 to 222.9 kA/m (2,000 to 2,800 Oe), a soluble Na content of not more than 30 ppm, a soluble Ca content of not more than 100 ppm, and an oxidation stability Δσs of not more than 10%.

In a seventh aspect of the present invention, there is provided a magnetic recording medium, comprising:

a non-magnetic base film; and a magnetic recording layer formed on the non-magnetic base film, comprising a binder resin and magnetic metal particles containing iron as a main component, comprising cobalt in an amount of 20 to 50 atm %, calculated as Co, based on whole Fe, aluminum in an amount of 3 to 15 atm %, calculated as Al, based on whole Fe and a rare earth element in an amount of 3 to 20 atm %, calculated as rare earth element, based on whole Fe, and having an average major axis diameter of from 0.02 to less than 0.05 µm, a coercive force of 159.2 to 222.9 kA/m (2,000 to 2,800 Oe), a soluble Na content of not more than 30 ppm, a soluble Ca content of not more than 100 ppm, and an oxidation stability $\Delta\sigma s$ of not more than 10%.

DETAILED DESCRIPTION OF THE INVENTION

The present invention is described in detail below.

First, the magnetic metal particles containing iron as a main component, comprising cobalt in an amount of usually 20 to 50 atm %, calculated as Co, based on whole Fe, aluminum in an amount of usually 3 to 15 atm %, calculated as Al, based on whole Fe, and a rare earth element in an amount of usually 3 to 20 atm %, calculated as rare earth element, based on whole Fe, and having an average major axis diameter of usually 0.02 to 0.065 µm, preferably from 0.02 to less than 0.05 µm, a coercive force of usually 159.2 to 222.9 kA/m (2,000 to 2,800 Oe), a soluble Na content of usually not more than 30 ppm, a soluble Ca content of usually not more than 100 ppm, and an oxidation stability $\Delta\sigma s$ of usually not more than 10%, according to the present invention are described.

The magnetic metal particles containing iron as a main component according to the present invention are spindle-shaped particles, and have an average major axis diameter of usually from 0.02 to less than 0.08 µm, preferably 0.02 to 0.065 µm, more preferably from 0.02 to less than 0.05 µm, still more preferably 0.025 to 0.048 µm. When the average major axis diameter is less than 0.02 µm, the magnetic metal particles are rapidly deteriorated in saturation magnetization value and oxidation stability. Simultaneously, it may be difficult to obtain magnetic metal particles having a high coercive force. When the average major axis diameter is not less than 0.08 µm, the magnetic metal particles have a large particle size and, therefore, may be unsuitable as magnetic particles for producing magnetic recording media exhibiting a high output at a short wavelength region and a lessened noise.

The magnetic metal particles containing iron as a main component according to the present invention have an aspect ratio of usually not less than 3:1, preferably 3.5:1 to 7:1. When the aspect ratio is less than 3:1, it may be difficult to obtain magnetic metal particles having a high coercive force.

Also, the magnetic metal particles containing iron as a main component according to the present invention have a crystallite size $D_{110}$ of usually 90 to 150 Å, preferably 100 to 140 Å. When the crystallite size $D_{110}$ of the magnetic metal particles is less than 90 Å, the magnetic recording media obtained using such magnetic metal particles are advantageously reduced in noise due to the particles, but tend to show a low saturation magnetization value as well as deteriorated oxidation stability. When the crystallite size $D_{110}$ is more than 150 Å, the magnetic metal particles are disadvantageously increased in noise due to the particles.

The BET specific surface area value of the magnetic metal particles containing iron as a main component according to the present invention is usually 40 to 80 $m^2/g$, preferably 50 to 80 $m^2/g$.

In addition, the Co content of the magnetic metal particles containing iron as a main component as a whole is usually 20 to 50 atm %, preferably 25 to 50 atm %, more preferably 30 to 50 atm % (calculated as Co) based on whole Fe; the Al content thereof is usually 3 to 15 atm %, preferably 3.5 to 15 atm %, more preferably 6 to 15 atm % (calculated as Al) based on whole Fe; and the rare earth element content thereof is usually 3 to 20 atm %, preferably 3 to 15 atm % (calculated as rare earth element) based on whole Fe.

When the Co content is less than 20 atm %, the magnetic metal particles may not be sufficiently improved in oxidation stability, and further it may be difficult to obtain magnetic metal particles having a high coercive force. When the Co content is more than 50 atm %, the obtained magnetic metal particles tend to be deteriorated in saturation magnetization value and coercive force. Further, the addition of such an unnecessarily large amount of Co is also unsuitable from the standpoint of production costs. When the Al content and the rare earth element content are less than the above-specified lower limits, the anti-sintering effect upon the heat-reducing process may be lowered, so that the obtained magnetic metal particles may be deteriorated in coercive force. On the other hand, when the Al content and the rare earth element content are more than the above-specified upper limits, non-magnetic components are comparatively increased, resulting in deterioration in magnetic properties such as saturation magnetization value of the obtained magnetic metal particles.

The magnetic metal particles containing iron as a main component according to the present invention have a soluble Na content of usually not more than 30 ppm, preferably not more than 20 ppm, more preferably not more than 10 ppm; and a soluble Ca content of usually not more than 100 ppm, preferably not more than 80 ppm, more preferably not more than 70 ppm. When the contents of these impurities are more than the above-specified upper limits, undesired compounds derived from the impurities tend to be precipitated on the surface of a magnetic coating film. Also, the amount of sulfur remaining in the magnetic metal particles is usually not more than 60 ppm, preferably not more than 50 ppm.

The magnetic metal particles containing iron as a main component according to the present invention have a coercive force Hc of usually 159.2 to 222.8 kA/m (2,000 to 2,800 Oe), preferably 159.2 to 214.9 kA/m (2,000 to 2,700 Oe); a saturation magnetization value $\sigma s$ of usually 90 to 160 $Am^2/kg$ (90 to 160 emu/g), preferably 90 to 150 $Am^2/kg$ (90 to 150 emu/g); and a squareness ($\sigma r/\sigma s$) of usually 0.51 to 0.55.

The magnetic metal particles containing iron as a main component according to the present invention have an oxidation stability $\Delta\sigma s$ of usually not more than 10%, preferably not more than 8%.

Next, the magnetic recording medium according to the present invention is described.

The magnetic recording medium of the present invention comprises a non-magnetic substrate, and a magnetic recording layer formed on the non-magnetic substrate, which comprises a binder resin and the magnetic metal particles containing iron as a main component of the present invention, which comprise cobalt in an amount of 20 to 50 atm %, calculated as Co, based on whole Fe, aluminum in an amount of 3 to 15 atm %, calculated as Al, based on whole Fe and a rare earth element in an amount of 3 to 20 atm %, calculated as rare earth element, based on whole Fe, and have an average major axis diameter of from 0.02 to less than 0.05 µm, a coercive force of 159.2 to 222.9 kA/m (2,000 to 2,800 Oe), a soluble Na content of not more than 30 ppm, a soluble Ca content of not more than 100 ppm and an oxidation stability Δσs of not more than 10%.

As the non-magnetic substrate, there may be used those presently used in ordinary magnetic recording media, e.g., films of synthetic resins such as polyethylene terephthalate, polyethylene, polypropylene, polycarbonates, polyethylene naphthalate, polyamides, polyamideimides and polyimides, foils and plates of metals such as aluminum and stainless steel, and various papers. The thickness of the non-magnetic substrate may be varied depending upon materials thereof, and is preferably 1.0 to 300 µm, more preferably 2.0 to 50 µm.

More specifically, in the case of magnetic discs, a non-magnetic substrate thereof may be usually made of polyethylene terephthalate, and has a thickness of usually 50 to 300 µm. In the case of magnetic tapes, a non-magnetic substrate thereof may be made of polyethylene terephthalate, polyethylene naphthalate, polyamide or the like; and the polyethylene terephthalate substrate has a thickness of usually 3 to 100 µm; the polyethylene naphthalate substrate has a thickness of usually 3 to 50 µm, and the polyamide substrate has a thickness of usually 2 to 10 µm.

As the binder, there may be used those presently used for the production of ordinary magnetic recording media, e.g., vinyl chloride-vinyl acetate copolymer, urethane resin, vinyl chloride-vinyl acetate-maleic acid copolymer, urethane elastomer, butadiene-acrylonitrile copolymer, polyvinyl butyral, cellulose derivatives such as nitrocellulose, polyester resin, synthetic rubber-based resin such as polybutadiene, epoxy resin, polyamide resin, polyisocyanate, electron beam-curable acrylic urethane resin, or mixtures thereof.

Also, the binder resin may contain polar groups such as —OH, —COOH, —SO$_3$M, —OPO$_2$M$_2$ and —NH$_2$, wherein M represents hydrogen, Na or K.

The magnetic recording layer formed on the non-magnetic substrate has a thickness of usually 0.01 to 5.0 µm. When the thickness is less than 0.01 µm, it may tend to be difficult to form a uniform magnetic recording layer because of coating unevenness or the like. When the thickness is more than 5.0 µm, it may tend to be difficult to obtain the aimed electromagnetic performance because of adverse influence of demagnetizing field.

The amount of the magnetic metal particles containing iron as a main component contained in the magnetic recording layer is usually 5 to 2,000 parts by weight based on 100 parts by weight of the binder resin.

Meanwhile, the magnetic recording layer may further contain, if required, known additives ordinarily used in magnetic recording media such as lubricants, abrasives, anti-static agents or the like in an amount of usually 0.1 to 50 parts by weight based on 100 parts by weight of the binder resin.

The magnetic recording medium produced by using the magnetic metal particles containing iron as a main component according to the present invention exhibits a coercive force Hc of usually 159.2 to 238.7 kA/m (2,000 to 3,000 Oe); a squareness (Br/Bm) of usually not less than 0.82, preferably not less than 0.85; an SFD of usually not more than 0.60, preferably not more than 0.50, more preferably not more than 0.45; an orientation degree of usually not less than 2.0, preferably not less than 2.3; an oxidation stability ΔBm of usually less than 8%, preferably less than 5%; and a surface roughness Ra of usually not more than 8 nm, preferably not more than 5 nm.

In addition, the magnetic coating film obtained using the magnetic metal particles containing iron as a main component produced according to the present invention has a coercive force Hc of usually 159.2 to 238.8 kA/m (2,000 to 3,000 Oe); a squareness (Br/Bm) of usually not less than 0.82; an SFD of usually not more than 0.60, preferably not more than 0.50; and an oxidation stability ΔBm of usually less than 8% and a surface roughness Ra of usually not more than 8 nm, preferably 5 nm.

In the magnetic recording medium of the present invention, a non-magnetic undercoat layer containing non-magnetic particles and a binder resin may be disposed between the non-magnetic substrate and the magnetic recording layer.

As the non-magnetic particles for the non-magnetic undercoat layer, there may be used non-magnetic inorganic particles ordinarily used in a non-magnetic undercoat layer of magnetic recording media. Specific examples of the non-magnetic particles may include particles of hematite, iron oxide hydroxide, titanium oxide, zinc oxide, tin oxide, tungsten oxide, silicon dioxide, α-alumina, β-alumina, γ-alumina, chromium oxide, cerium oxide, silicon carbide, titanium carbide, silicon nitride, boron nitride, calcium carbonate, barium carbonate, magnesium carbonate, strontium carbonate, calcium sulfate, barium sulfate, molybdenum disulfide, barium titanate or the like. These non-magnetic particles may be used alone or in combination of any two or more thereof. Among these non-magnetic particles, particles of hematite, iron oxide hydroxide and titanium oxide, etc., are preferred.

Upon the production of a non-magnetic coating composition, in order to improve a dispersibility thereof in vehicles, the surface of the non-magnetic particles may be coated, if required, with hydroxides of aluminum, oxides of aluminum, hydroxides of silicon, oxides of silicon or the like. In addition, in order to improve properties of the obtained magnetic recording medium such as light transmittance, surface resistivity, mechanical strength, surface smoothness, durability or the like, various elements such as Al, Ti, Zr, Mn, Sn, Sb, etc., may be incorporated into the non-magnetic particles according to requirements.

The non-magnetic particles may have various shapes, and may include, for example, granular particles such as spherical particles, granulated particles, octahedral particles, hexahedral particles and polyhedral particles; acicular particles such as needle-like particles, spindle-shaped particles and rice ball-shaped particles; plate-shaped particles; or the like. In the consideration of good surface smoothness of the obtained magnetic recording medium, the non-magnetic particles preferably have an acicular particles.

The non-magnetic particles has an average particle diameter of usually 0.01 to 0.3 µm, and may be usually of granular, acicular or plate shape.

The acicular non-magnetic particles have an aspect ratio of usually 2:1 to 20:1, and the plate-shaped non-magnetic particles have a plate ratio (average plate surface diameter/average thickness) of usually 2:1 to 50:1.

The non-magnetic undercoat layer preferably has a thickness of 0.2 to 10.0 µm. When the thickness of the non-magnetic undercoat layer is less than 0.2 µm, it is difficult to improve the surface roughness of the non-magnetic substrate.

As the binder resin for the non-magnetic undercoat layer, there may be used those binder resins exemplified above for the production of the magnetic recording layer.

The amount of the non-magnetic particles contained in the non-magnetic undercoat layer is usually 5 to 2,000 parts by weight based on 100 parts by weight of the binder resin.

Meanwhile, the non-magnetic undercoat layer may further contain, if required, known additives ordinarily used in magnetic recording media such as lubricants, abrasives, anti-static agents or the like in an amount of usually 0.1 to 50 parts by weight based on 100 parts by weight of the binder resin.

In the present invention, the magnetic recording medium having the non-magnetic undercoat layer has the substantially same properties as those of the magnetic recording medium having no non-magnetic undercoat layer as described above. The magnetic recording medium having the non-magnetic undercoat layer according to the present invention can be readily surface-smoothened by calendaring treatment, and can be improved in running durability since a lubricant can be supplied from the non-magnetic undercoat layer.

Next, the process for producing the magnetic metal particles containing iron as a main component, which comprise cobalt in an amount of 20 to 50 atm %, calculated as Co, based on whole Fe, aluminum in an amount of 3 to 15 atm %, calculated as Al, based on whole Fe and a rare earth element in an amount of 3 to 20 atm %, calculated as rare earth element, based on whole Fe, and have an average major axis diameter of usually 0.02 to 0.08 μm, preferably 0.025 to 0.075 μm, a coercive force of 159.2 to 222.9 kA/m (2,000 to 2,800 Oe), a soluble Na content of not more than 30 ppm, a soluble Ca content of not more than 100 ppm and an oxidation stability Δσs of not more than 10%, according to the present invention is described.

In the process of the present invention, the magnetic metal particles containing iron as a main component can be produced by first producing spindle-shaped goethite particles by the method described in detail below; adding a cobalt compound and an alkali metal carbonate to a water suspension containing the goethite particles or spindle-shaped hematite particles obtained by heat-dehydrating the goethite particles at a temperature of usually 400 to 750° C., to form a cobalt carbonate coat on the surface thereof; further forming a rare earth compound coat on the surface of the cobalt carbonate coat; and subjecting either the thus obtained surface-coated goethite particles or spindle-shaped hematite particles, to heat reduction at a temperature of usually 350 to 700° C.

The spindle-shaped goethite particles used in the present invention are obtained as follows. Namely, the spindle-shaped goethite particles are produced by reacting an aqueous ferrous sulfate solution with a mixed aqueous alkali solution composed of an aqueous ammonium hydrogen carbonate solution in an amount of 1.7 to 3.0 equivalents based on equivalent of the aqueous ferrous sulfate solution and an aqueous ammonium hydroxide solution to obtain a water suspension containing a ferrous-containing precipitate; aging the water suspension containing the ferrous-containing precipitate in a non-oxidative atmosphere; passing an oxygen-containing gas through the water suspension to conduct an oxidation reaction thereof, thereby producing spindle-shaped goethite seed crystal particles; and then growing a goethite layer on the surface of the goethite seed crystal particles by passing an oxygen-containing gas through the water suspension containing the goethite seed crystal particles and the ferrous-containing precipitate to conduct an oxidation reaction thereof, wherein the mixed aqueous alkali solution used above contains the aqueous ammonium hydroxide solution in an amount of usually 55 to 85 mol % based on the mixed aqueous alkali solution; upon the production of the seed crystal particles, a Co compound is added in an amount of 10 to 45 atm % (calculated as Co) based on whole Fe, to the water suspension containing the ferrous-containing precipitate during the aging before initiation of the oxidation reaction; the oxidation reaction is then conducted until 20 to 80% of whole $Fe^{2+}$ is oxidized; upon growth of the goethite layer, an Al compound is added in an amount of 0.5 to 15 atm % (calculated as Al) based on whole Fe, to the water suspension containing the goethite seed crystal particles and the ferrous-containing precipitate so as to adjust a pH value of the water suspension to usually less than 9.0, thereby producing the spindle-shaped goethite particles; and after filtering out the thus produced spindle-shaped goethite particles from the water suspension, the goethite particles are washed with aqueous ammonia having a pH value of usually 9.5 to 11.5.

Upon the production reaction of the spindle-shaped goethite seed crystal particles, the use of an aqueous ferrous salt solution other than the aqueous ferrous sulfate solution, such as an aqueous ferrous chloride solution is undesirable because of containing chlorine. The ferrous concentration of a solution obtained after mixing the aqueous ferrous sulfate solution with the mixed aqueous alkali solution is usually 0.1 to 1.0 mol/liter, preferably 0.2 to 0.8 mol/liter. When the ferrous concentration is less than 0.1 mol/liter, the yield of the spindle-shaped goethite particles is too low and, therefore, industrially disadvantageous. When the ferrous concentration is more than 1.0 mol/liter, the particle size distribution of the obtained goethite particles becomes too broad.

The mixed aqueous alkali solution used in the present invention is composed of an aqueous ammonium hydrogen carbonate ($NH_4HCO_3$) solution and an aqueous ammonium hydroxide ($NH_4OH$) solution. When an aqueous alkali solution containing alkali metals is used, the alkali metals remain in the obtained particles, thereby failing to obtain the aimed magnetic metal particles from which soluble salts are removed. As to the mixing ratio between the aqueous ammonium hydrogen carbonate solution and the aqueous ammonium hydroxide solution, the aqueous ammonium hydroxide solution may be contained in an amount of usually 55 to 85 mol %, preferably 57 to 80 mol % based on the mixed aqueous alkali solution. When the amount of the aqueous ammonium hydrogen carbonate solution is too large, the aspect ratio of the obtained goethite particles becomes small. On the other hand, when the amount of the aqueous ammonium hydroxide solution is too large, not only production of magnetite but also elution of cobalt tend to be caused.

The total amount of the aqueous ammonium hydrogen carbonate solution and the aqueous ammonium hydroxide solution used is usually 1.7 to 3.0 equivalents, preferably 1.75 to 2.85 equivalents based on equivalent of whole Fe contained in the aqueous ferrous sulfate solution. When the total amount of the aqueous ammonium hydrogen carbonate solution and the aqueous ammonium hydroxide solution used is less than 1.7 equivalents, magnetite tends to be mixed in the obtained particles. The use of the aqueous ammonium hydrogen carbonate solution and the aqueous ammonium hydroxide solution in a total amount of more than 3.0 equivalents is disadvantageous from industrial viewpoints.

The pH value of the water suspension containing the ferrous-containing precipitate used in the present invention is usually 7.5 to 9.5, preferably 8.0 to 9.0. When the pH value of the water suspension is less than 7.5, magnetite tends to be disadvantageously mixed in the obtained particles. When the pH value of the water suspension is more than 9.5, the amount of cobalt eluted out is remarkably increased.

The aging reaction of the spindle-shaped goethite seed crystal particles is conducted under stirring in a non-oxidative atmosphere. Here, the non-oxidative atmosphere may be an atmosphere formed by passing an inert gas such as nitrogen gas or a reducing gas such as hydrogen gas through the water suspension. Among these gases, preferred is nitrogen gas.

The aging reaction of the spindle-shaped goethite seed crystal particles is preferably conducted by aging the water suspension at a temperature of usually 40 to 80° C. in a non-oxidative atmosphere. When the aging temperature is less than 40° C., the aspect ratio of the obtained particles is small, resulting in insufficient aging effect. When the aging temperature is more than 80° C., magnetite tends to be mixed in the obtained particles. The aging time is usually 30 to 300 minutes. When the aging time is less than 30 minutes, it may be difficult to achieve a sufficiently large aspect ratio. When the aging time is more than 300 minutes, ammonia is vaporized, so that it may be difficult to attain a sufficient aging effect.

The oxidization upon the production reaction of the spindle-shaped goethite seed crystal particles is conducted by passing an oxygen-containing gas such as air through the water suspension.

The production reaction of the spindle-shaped goethite seed crystal particles may be conducted at a temperature of usually not more than 80° C. at which the goethite particles can be produced. When the production reaction temperature is more than 80° C., magnetite tends to be mixed in the obtained spindle-shaped goethite particles. The production reaction temperature is preferably 45 to 55° C.

In the production reaction of the spindle-shaped goethite seed crystal particles, a Co compound such as cobalt sulfate or cobalt nitrate is added to the water suspension containing the ferrous-containing precipitate during the aging before initiation of the oxidation reaction. The amount of Co added is usually 10 to 35 atm %, preferably 12 to 35 atm % (calculated as Co) based on whole Fe contained in the spindle-shaped goethite particles as final product. When the amount of Co added is less than 10 atm %, the magnetic metal particles obtained using such particles fail to be improved in magnetic properties. When the amount of Co added is more than 35 atm %, the obtained particles are too fine and, therefore, show a low aspect ratio.

The production reaction of the spindle-shaped goethite seed crystal particles may be conducted until usually 20 to 80% of whole $Fe^{2+}$ is oxidized. When the oxidation percentage of whole $Fe^{2+}$ is less than 20%, the aspect ratio of the obtained particles is too small, so that the magnetic metal particles obtained using such particles fail to show a high coercive force. On the other hand, when the oxidation percentage of whole $Fe^{2+}$ is more than 80%, the production of goethite particles is nearly completed, so that the effect of the Al compound subsequently added cannot be sufficiently exhibited, resulting in deteriorated coercive force of the obtained particles.

Upon growing a goethite layer on the surface of the spindle-shaped goethite seed crystal particles by passing an oxygen-containing gas through the water suspension containing the spindle-shaped goethite seed crystal particles, an Al compound is added to the water suspension to obtain Al-containing spindle-shaped goethite particles.

As the Al compound, there may be used acid salts such as aluminum sulfate and aluminum nitrate or aluminates such as ammonium aluminate. As to the timing of addition of the Al compound, it may be added to either the water suspension containing the spindle-shaped goethite seed crystal particles and the ferrous-containing precipitate before passing an oxygen-containing gas therethrough in the growth reaction, or the water suspension during the growth reaction. In particular, the Al compound is preferably added before initiation of the growth reaction. Also, the Al compound may be added either in divided parts, continuously or intermittently.

The amount of the Al compound added is usually 3 to 15 atm %, preferably 3.5 to 14 atm % (calculated as Al) based on whole Fe contained in the spindle-shaped goethite particles as final product. When the amount of the Al compound added is less than 3 atm %, the anti-sintering effect cannot be sufficiently exhibited. On the other hand, when the amount of the Al compound added is more than 15 atm %, the aspect ratio of the obtained particles becomes too small.

The pH value of the water suspension upon the growth reaction of the goethite layer is usually less than 9.0, preferably 7.0 to 8.8. When the pH value is not less than 9.0, cobalt tends to be eluted out, so that the magnetic metal particles obtained using such goethite particles fail to show a high coercive force as aimed by the present invention. When the pH value is less than 7, magnetite tends to be mixed in the obtained particles.

The oxidation upon the growth reaction of the goethite layer may be conducted by passing an oxygen-containing gas such as air through the water suspension.

The growth reaction of the goethite layer may be conducted at a temperature of usually not more than 80° C. at which the goethite particles can be produced. When the temperature is more than 80° C., magnetite tends to be mixed in the obtained spindle-shaped goethite particles. The temperature used upon the growth reaction of the goethite layer is preferably 45 to 55° C.

The thus obtained spindle-shaped goethite particles are washed with aqueous ammonia having a pH value of usually 9.5 to 11.5, so that sulfate ions can be removed therefrom. When the pH value of the aqueous ammonia is out of the above range, it may be difficult to sufficiently remove the sulfate ions from the spindle-shaped goethite particles. The temperature of the aqueous ammonia is usually 20 to 50° C. When the temperature of the aqueous ammonia is less than 20° C., the washing efficiency may be deteriorated. When the temperature of the aqueous ammonia is more than 50° C., ammonia may be disadvantageously vaporized.

After washing with the aqueous ammonia, the spindle-shaped goethite particles are preferably washed with water. As the washing water there may be suitably used ion-exchanged water.

The thus obtained spindle-shaped goethite particles have an average major axis diameter of usually 0.06 to 0.15 μm, preferably 0.06 to 0.14 μm; an aspect ratio of usually 6.5 to 12, preferably 7 to 12; a BET specific surface area value of usually 100 to 250 m$^2$/g; a Co content of usually 10 to 35 atm % (calculated as Co) based on whole Fe; and an Al content of usually 3 to 15 atm % (calculated as Al) based on whole Fe.

In the present invention, it is important that the surface of the spindle-shaped goethite particles is then coated with cobalt carbonate. The coating of the goethite particles with cobalt carbonate enables the reducing velocity thereof to be readily controlled, resulting in enhancement of the anti-sintering effect.

As the cobalt compound added to the water suspension containing the goethite particles, there may be suitably used cobalt acetate or cobalt nitrate. The total amount of the cobalt compound added and Co previously contained in the goethite particles is usually not more than 50 atm % (calculated as Co) based on whole Fe.

The surface of the goethite particles may be coated with cobalt carbonate by adding an aqueous alkali carbonate solution containing alkali metals to the water suspension containing the goethite particles and the Co compound. As the aqueous alkali carbonate solution containing alkali metals, there may be suitably used an aqueous sodium carbonate solution or an aqueous potassium carbonate solution. When an aqueous alkali solution other than the aqueous alkali carbonate solution containing alkali metals is used, it may be difficult to form the cobalt carbonate coat on the surface of the goethite particles, thereby failing to obtain magnetic metal particles having excellent dispersibility and oxidation stability. Meanwhile, the alkali metals adhered onto the surface of the goethite particles upon the coating reaction may be readily removed by washing the particles with water.

As the rare earth element coated onto the surface of the goethite particles having the cobalt carbonate coat, there may be suitably used at least one element selected from the group consisting of yttrium, neodymium, lanthanum, cerium, scandium, praseodymium and samarium. As the rare earth compound added, there may be suitably used chlorides, nitrides, etc. of the above rare earth elements.

The amount of the rare earth compound added is usually 3 to 20 atm %, preferably 3 to 15 atm % (calculated as rare earth element) based on whole Fe. When the amount of the rare earth compound added is less than 3 atm %, a sufficient anti-sintering effect may not be attained, so that the magnetic metal particles obtained using such goethite particles may be deteriorated in SFD (coercive force distribution) or the like. When the amount of the rare earth compound added is more than 20 atm %, the obtained particles may be deteriorated in saturation magnetization value.

The rare earth compound added may be coated in the form of carbonates or hydroxides on the surface of the goethite particles coated with cobalt carbonate by adding an aqueous alkali carbonate solution to the reaction solution to adjust the pH value thereof. The alkali metals adhered upon the coating reaction may be readily removed from the goethite particles by washing the particles with water.

The thus obtained goethite particles have a cobalt carbonate coat formed on the surface of the goethite particles containing cobalt and aluminum, and a rare earth compound coat formed on the surface of the cobalt carbonate coat.

Thus, by successively coating the surface of the spindle-shaped goethite particles with cobalt carbonate and then with the rare earth compound, it is possible to obtain the spindle-shaped hematite particles which are prevented from undergoing sintering within and between the particles, and which still retain a particle shape and an aspect ratio substantially equivalent to those of the previous spindle-shaped goethite particles. This allows magnetic metal particles containing iron as a main component which can still retain a particle shape, etc. substantially equivalent to those of the previous particle, etc. and which are in the form of individual separate particles, to be readily produced therefrom.

Next, the thus obtained surface-coated spindle-shaped goethite particles are subjected to heat-reduction treatment.

Meanwhile, in order to suitably control magnetic properties, particle properties and particle shape, the spindle-shaped goethite particles are preliminarily heat-dehydrated to produce spindle-shaped hematite particles in a non-reducing atmosphere prior to the heat-reduction treatment.

The non-reducing atmosphere is an atmosphere obtained by flowing of at least one gas selected from the group consisting of air, oxygen gas and nitrogen gas. The heat-dehydrating temperature is usually 400 to 750° C. However, the heat-dehydrating temperature may be appropriately varied and selected from the above range depending upon the kinds of compounds used upon the coating treatments of the spindle-shaped goethite particles. When the heat-dehydrating temperature is less than 400° C., the heat-dehydration treatment requires a too long period of time. When the heat-dehydrating temperature is more than 750° C., there may be caused disadvantages such as deformation of the particles and sintering within or between the particles.

The spindle-shaped hematite particles have an average major axis diameter of usually 0.05 to 0.15 µm, preferably 0.05 to 0.14 µm; and an aspect ratio of usually 6.5:1 to 12:1, preferably 7:1 to 12:1; and a BET specific surface area value of usually 30 to 140 m$^2$/g.

Further, the spindle-shaped hematite particles have a cobalt content of usually 20 to 50 atm % (calculated as Co) based on whole Fe; an Al content of usually 3 to 15 atm % (calculated as Al) based on whole Fe; and a rare earth element content of usually 3 to 20 atm % (calculated as rare earth element) based on whole Fe.

The heat-reducing temperature used in the present invention is in the range of usually 350 to 700° C. When the heat-reducing temperature is less than 350° C., the reduction reaction may proceed too slowly, thereby requiring a too long period of time. Further, the magnetic metal particles obtained from such particles show an insufficient crystal growth, resulting in remarkable deterioration in magnetic properties such as saturation magnetization value and coercive force. When the heat-reducing temperature is more than 700° C., the reduction reaction may proceed too rapidly, thereby causing disadvantages such as deformation of the particles and sintering within or between the particles.

The magnetic metal particles containing iron as a main component according to the present invention which are obtained after the heat-reduction treatment may be taken out in air by known methods, for example, by immersing the particles in an organic solvent such as toluene; by temporarily replacing the atmosphere existing around the magnetic metal particle containing iron as a main component after the reduction reaction, with an inert gas, and then gradually increasing an oxygen content in the inert gas until it finally reaches that of air; by gradually oxidizing the particles using a mixed gas of oxygen and steam; or the like.

The point of the present invention is that by first producing spindle-shaped goethite particles containing aluminum and cobalt without using an aqueous alkali solution containing alkali metals, forming a cobalt carbonate coat on the surface of the thus produced spindle shaped goethite particles, further forming a rare earth compound coat on the surface of the cobalt carbonate coat, and then heat-reducing the thus obtained surface-coated goethite particles, it is possible to obtain magnetic metal particles containing iron as a main component which exhibit a high coercive force, an excellent oxidation stability and a less soluble salt content in spite of fine particles having an average major axis diameter of 0.02 to 0.08 µm, preferably 0.02 to 0.065 µm, more preferably from 0.02 to less than 0.05 µm.

In the present invention, the aqueous ammonium hydrogen carbonate solution and the aqueous ammonium hydroxide solution are used in order not to cause alkali metals to remain in the obtained particles. Conventionally, when an aqueous solution of ammonium compounds is used as the aqueous alkali solution, the pH value of the water suspension containing the Fe-containing precipitate cannot be increased because cobalt is eluted out in the form of an ammine complex ($[M(NH_3)_a]^{n+}$ wherein M represents a n-valent metal ion). When the pH value is decreased, there arise problems such as inclusion of magnetic and low aspect ratio of the obtained goethite particles. On the contrary, in the present invention, the production reaction of the goethite particles is conducted under such specific pH conditions (pH 7.5 to 9.5) of the water suspension where no inclusion of magnetite is caused and the aspect ratio is prevented from being decreased.

On the other hand, by controlling the pH value of the water suspension containing the ferrous-containing precipitate to the specific range of 7.5 to 9.5, the obtained goethite particles tend to absorb anions since no alkali metals are present therein, resulting in production of goethite particles containing a large amount of sulfate ions. The sulfate ions cannot be sufficiently removed by washing with ordinary water. However, in the present invention, since the above goethite particles are subsequently washed with aqueous ammonia having a pH value of 9.5 to 11.5, it becomes possible to remove the sulfate ions therefrom.

As described above, although a sufficient amount of cobalt is not absorbed in the presence of the ammonium compound, by using the aqueous alkali carbonate solution to coat the surface of the goethite particles with cobalt, a substantially whole amount of the cobalt compound added can be coated in the form of a cobalt carbonate coat onto the surface of the goethite particles. In the present invention, by coating the surface of the goethite particles with cobalt carbonate, the reducing velocity can be readily controlled, resulting in improved anti-sintering effect. The reason therefor is considered as follows, though it is not clearly known. That is, since the surface of the goethite particles is uniformly coated with fine cobalt carbonate particles, the obtained particles can be improved in anti-sintering effect as compared to the case where other cobalt compounds such as cobalt hydroxide are coated thereon.

In the present invention, the surface of the cobalt carbonate coat is further coated with the rare earth compound. By coating the surface of the goethite particles with the hardly-reducible rare earth compound in the form of an outermost coat, the obtained goethite particles can be kept spaced apart from each other without close contact therebetween, thereby preventing occurrence of sintering upon the reduction treatment and retaining the spindle particle shape. Therefore, it is possible to obtain magnetic metal particles exhibiting excellent magnetic properties and oxidation stability in spite of fine particles. Meanwhile, the alkali metals adhered onto the particles upon the coating reaction can be readily removed therefrom by washing with water.

Further, when using the magnetic metal particles of the present invention, it is possible to inhibit generation of precipitates on the magnetic coating film and adhesion of precipitates onto magnetic head. The reason therefor is considered as follows, though not clearly determined. That is, it is considered that since the magnetic metal particles of the present invention exhibit an excellent oxidation stability, the surface activity of the magnetic metal particles and the reactivity of metal components thereof are lowered, thereby reducing adverse influence on aliphatic acids and resin components contained in the magnetic recording medium. As a result, the magnetic recording medium can show a high keeping property, i.e., is free from deteriorated output, drop-out, increased friction coefficient, clogging of the head or the like, based on storage thereof.

Thus, the magnetic metal particles containing iron as a main component according to the present invention can show a high coercive force, a less soluble salt content and an excellent oxidation stability in spite of fine particles having a major axis diameter as small as from 0.02 to less than 0.05 μm and, therefore, are suitably used as magnetic particles for magnetic recording media exhibiting a high-density recording property, a high output, a high reliability and an improved weather resistance.

EXAMPLES

The present invention is described in more detail by Examples and Comparative Examples, but the Examples are only illustrative and, therefore, not intended to limit the scope of the present invention.

Various properties were evaluated by the following methods.

(1) The average major axis diameter, average minor axis diameter and aspect ratio of the spindle-shaped goethite particles, spindle-shaped hematite particles and magnetic metal particles containing iron as a main component are respectively expressed by an average of values measured by an electron microscope.

(2) The contents of Co, Al, rare earth element, Na, Ca and other metal elements contained in the spindle-shaped goethite particles, spindle-shaped hematite particles and magnetic metal particles containing iron as a main component, were measured using an inductively coupled high-frequency plasma atomic emission spectroscope ("SPS-4000" manufactured by Seiko Denshi Kogyo Co., Ltd.).

(3) The amount of sulfur remaining in the magnetic metal particles iron as a main component was measured by "Carbon and Sulfur Measuring Apparatus" (manufactured by Horiba Seisakusho Co., Ltd.).

(4) The BET specific surface area value of particles is expressed by the value measured by BET method using "Monosorb MS-11" (manufactured by Cantachrom Co., Ltd.).

(5) The crystallite size $D_{110}$ of particles (X-ray crystal grain size of magnetic metal particles containing iron as a main component) is expressed by the thickness of crystallite in the direction perpendicular to each crystal plane (110) of the magnetic metal particles containing iron as a main component as measured by X-ray diffraction method. The thickness value was calculated based on the X-ray diffraction peak curve prepared with respect to each crystal plane by using the following Scherrer's formula:

$$D_{110} = K\lambda/\beta\cos\theta$$

wherein β is a true half-width of the diffraction peak which was corrected with respect to the width of machine used (unit: radian); K is a Scherrer constant (=0.9); λ is a wavelength of X-ray used (Cu Kα-ray 0.1542 nm); and θ is a diffraction angle (corresponding to a diffraction peak of crystal plane (110)).

(6) The magnetic properties of magnetic metal particles containing iron as a main component were measured using a vibration sample magnetometer "VSM-3S-15" (manufactured by Toei Kogyo Co., Ltd.) by applying an external magnetic field of 795.8 kA/m (10 kOe) thereto.

(7) The magnetic properties of the magnetic coating film were measured by the following method.

The respective components as shown below were charged into a 100 ml plastic bottle, and then mixed and dispersed for 8 hours using a paint shaker (manufactured by Reddevil Co., Ltd.), thereby preparing a magnetic coating composition. The thus prepared magnetic coating composition was coated on a 25 µm-thick polyethylene telephthalate film using an applicator to form a coating layer having a thickness of 50 µm thereon.

The obtained coating film was then dried in a magnetic field of 500 mT (5 kGauss), thereby obtaining a magnetic coating film. The magnetic properties of the thus obtained magnetic coating film were measured by using a vibration sample magnetometer "VSM-3S-15" (manufactured by Toei Kogyo Co., Ltd.) by applying an external magnetic field of 795.8 kA/m (10 kOe) thereto.

| Coating composition | |
|---|---|
| 3 mmϕ steel balls | 800 parts by weight |
| Magnetic metal particles containing iron as a main component | 100 parts by weight |
| Polyurethane resin having sodium sulfonate groups | 20 parts by weight |
| Cyclohexanone | 83.3 parts by weight |
| Methyl ethyl ketone | 83.3 parts by weight |
| Toluene | 83.3 parts by weight |

(8) The magnetic properties of the magnetic tape were measured by the following method.

Production of Magnetic Tape:

The preparation and application of a coating material were performed by the following method, thereby producing a magnetic tape composed of magnetic layer/non-magnetic undercoat layer/polyethylene terephthalate film.

| Composition of coating material for upper magnetic layer: | |
|---|---|
| Magnetic metal particles containing iron as a main component | 100 parts by weight |
| <Binder> | |
| Vinyl chloride-based copolymer resin (tradename: MR104 produced by Nippon Zeon Co., Ltd.) | 10 parts by weight |
| Polyurethane resin (tradename: UR-8200 produced by Toyobo Co., Ltd.) | 10 parts by weight |
| α-alumina (tradename: AKP-50 produced by Sumitomo Kagaku Co., Ltd.) | 10 parts by weight |
| Carbon black (tradename: 3250 produced by Mitsubishi Kagaku Co., Ltd.) | 3 parts by weight |
| <Lubricant> | |
| Myristic acid | 1 part by weight |
| Butyl stearate | 2 parts by weight |
| <Curing agent> | |
| Isocyanate-based curing agent (tradename: E-31 produced by Takeda Yakuhin Co., Ltd.) | 5 parts by weight |
| <Solvent> | |
| Methyl ethyl ketone | 114 parts by weight |
| Toluene | 68 parts by weight |
| Cyclohexanone | 46 parts by weight |

Method of Forming a Coating Material for Upper Magnetic Layer:

The above magnetic metal particles containing iron as a main component, vinyl chloride-based copolymer resin, α-alumina, carbon black and solvent were mixed together, kneaded by a pressure kneader, and then diluted with the solvent. Further, the urethane-based copolymer resin was added to the mixture, and dispersed by a sand mill. The resultant dispersion was mixed with the lubricant and solvent to control a solid content thereof to an adequate level, and then passed through a filter. Before coating, the thus obtained material was mixed with the curing agent under stirring, thereby preparing a magnetic coating material.

| Composition of a coating material for lower non-magnetic layer: | |
|---|---|
| Acicular non-magnetic hematite particles (major axis diameter: 0.16 µm; minor axis diameter: 0.026 µm; aspect ratio: 6.2:1; BET specific surface area: 49.1 m$^2$/g; Al content: 3.5 wt. %) | 100 parts by weight |
| <Binder> | |
| Vinyl chloride-based copolymer resin (tradename: MR104 produced by Nippon Zeon Co., Ltd.) | 7.5 parts by weight |
| Polyurethane resin (tradename: UR-8200 produced by Toyobo Co., Ltd.) | 7.5 parts by weight |
| <Lubricant> | |
| Myristic acid | 2.5 part by weight |
| Butyl stearate | 2.5 parts by weight |
| <Curing agent> | |
| Isocyanate-based curing agent (tradenaine: E-31 produced by Takeda Yakuhin Co., Ltd.) | 5 parts by weight |
| <Solvent> | |
| Methyl ethyl ketone | 93 parts by weight |
| Toluene | 55 parts by weight |
| Cyclohexanone | 36 parts by weight |

Method of Forming a Coating Material for Lower Non-magnetic Layer:

The above non-magnetic particles, vinyl chloride-based copolymer resin and solvent were mixed together, kneaded by a pressure kneader, and then diluted with the solvent. Further, the urethane-based copolymer resin was added to the mixture, and dispersed by a sand mill. The resultant dispersion was mixed with the lubricant and solvent to control a solid content thereof to an adequate level, and then passed through a filter. Before coating, the thus obtained coating material was mixed with the curing agent under stirring, thereby preparing a non-magnetic coating material.

Coating Method:

The above-prepared non-magnetic coating material and magnetic coating material were sequently applied onto a 7 µm-thick polyethylene terephthalate film to form a non-magnetic undercoat layer and then a magnetic layer having thicknesses of 1.1 µm and 0.10 µm (upon drying), respectively, thereon. The thus obtained coating film was magnetically oriented by a solenoid magnet, dried, surface-smoothened by calendering, and then cured.

Successively, a coating material for back coat, containing carbon black, vinyl chloride-based copolymer resin and polyurethane-based resin was applied onto the back side of the polyethylene terephthalate film opposite to the side where the non-magnetic and magnetic layers were formed, and then dried to form a back coat layer. The obtained film was slit into 8 mm width, thereby producing a magnetic tape.

(9) The Δσs value showing an oxidation stability of saturation magnetization of the magnetic metal particles, and the ΔBm value showing a weather resistance of saturation magnetic flux density (Bm) of the magnetic coating film and magnetic tape were measured as follows.

The magnetic metal particles, the magnetic coating film piece and the magnetic tape piece were placed in a constant-temperature oven maintained at 60° C. and a relative humidity of 90%, and allowed to stand therein for one week to conduct an accelerated deterioration test. Thereafter, the particles, the magnetic coating film piece and the magnetic tape piece were measured to determine the saturation magnetization value (σs') and saturation magnetic flux density (Bm'), respectively. The oxidation stability values Δσs and ΔBm were calculated by dividing the difference (absolute value) between the σs values measured before and after the one-week accelerated test, and the difference (absolute value) between the Bm values measured before and after the one-week accelerated test, by the values σs and Bm measured before the accelerated test, respectively. The closer to zero the Δσs and ΔBm values, the more excellent the oxidation stability.

(10) The magnetic properties of the magnetic tape were measured using a vibration sample magnetometer "VSM-3S-15" (manufactured by Toei Kogyo Co., Ltd.) by applying an external magnetic field of 795.8 kA/m (10 kOe) thereto.

(11) The surface roughness Ra of the magnetic tape was determined by measuring a center line average roughness thereof using a stylus-type surface roughness tester (Model: Surfcom-575A manufactured by Tokyo Seimitsu Co., Ltd.).

(12) The electromagnetic performance of the magnetic tape was measured using a fixed head-type electro-magnetometer (Model: Drum Tester BX-3168 manufactured by Belbex Co., Ltd.). Specifically, the magnetic tape was wound around a drum. While rotating the drum such that the relative speed between the magnetic tape and a head was 3.3 m/second, 10 kHz short-wavelength signals were recorded on the magnetic tape at its optimum recording current, and the 10 kHz output level was measured by a spectrum analyzer. Then, the 9 kHz noise level (recording frequency: 1 kHz) was measured, and the C/N ratio was determined as the difference between the 10 kHz output level and the 9 kHz noise level. Meanwhile, the output level and the C/N level were expressed by absolute values (dB) relative to those of a reference tape. As the reference tape, there was used the tape obtained in Comparative Example 1.

Example 1

<Production of Spindle-shaped Goethite Particles>

30 liters of a mixed aqueous alkali solution containing ammonium hydrogen carbonate and aqueous ammonia in amounts of 20 mol and 60 mol (concentration of the aqueous ammonium hydroxide solution corresponds to 75 mol % (calculated as normality) based on mixed alkalis), respectively, was charged into a reaction tower equipped with a stirrer having bubble dispersing blades, and heated to 50° C. while rotating the stirrer at 400 rpm and passing a nitrogen gas at a flow rate of 60 liters/min through the reaction tower. Then, 16 liters of an aqueous ferrous sulfate solution containing 20 mol of $Fe^{2+}$ (concentration of the mixed aqueous alkali solution corresponds to 1.875 equivalents (calculated as normality) based on ferrous sulfate) was charged into the bubble tower, and the contents of the bubble tower were aged therein for 25 minutes. Thereafter, 4 liters of an aqueous cobalt sulfate solution containing 4.0 mol of $Co^{2+}$ (corresponding to 20 atm % (calculated as Co) based on whole Fe) was added to the bubble tower and the contents of the bubble tower were further aged for 3 hours. After aging, air was passed through the bubble tower at a flow rate of 2 liters/min to conduct the oxidation reaction until the oxidation percentage of $Fe^{2+}$ reached 30%.

Then, one liter of an aqueous aluminum sulfate solution containing 1.6 mol of $Al^{3+}$ (corresponding to 8 atm % (calculated as Al) based on whole Fe) was added, and the oxidation reaction was continued until completion thereof. It was confirmed that the pH value of the reaction solution upon termination of the reaction was 8.4.

The thus obtained slurry containing goethite particles was filtered using a press filter to remove the goethite particles therefrom, and the separated goethite particles were washed with aqueous ammonia whose pH value was adjusted to 10.5, and then with ion-exchanged water, thereby obtaining a press cake. It was confirmed that a filtrate obtained after the filtration contained Co in an amount of 55 ppm.

A part of the resultant press cake was dried and pulverized by ordinary methods, thereby obtaining spindle-shaped goethite particles. It was confirmed that the obtained goethite particles had an average major axis diameter of 0.098 μm, an average minor axis diameter of 0.0095 μm, an aspect ratio of 8.8:1, a BET specific surface area value of 189.6 $m^2/g$, a Co content of whole particles of 19.9 atm % based on whole Fe, and an Al content of whole particles of 8 atm % based on whole Fe. Further, it was confirmed that the Co absorption percentage (residual amount of Co/amount of Co added) was 99.3%.

<Production of Spindle-shaped Hematite Particles>

After the press cake containing the thus obtained spindle-shaped goethite particles was sufficiently dispersed in water, an aqueous cobalt acetate solution (containing Co in an amount of 15 atm % based on whole Fe) was added thereto, and the resultant dispersion was fully stirred. Then, an aqueous sodium carbonate solution was added to the dispersion while stirring so as to adjust the pH thereof to 8.8. Thereafter, an aqueous yttrium nitrate solution (containing Y in an amount of 12 atm % based on whole Fe) was added to the dispersion, and the resultant dispersion was mixed under stirring. Further, an aqueous sodium carbonate solution was added to the dispersion so as to adjust the pH value thereof to 9.3. Thereafter, the obtained dispersion was filtered using a filter press and washed with water, thereby obtaining a press cake. The obtained press cake was extrusion-molded and granulated using an extrusion-molding machine equipped with a mold plate having an orifice diameter of 3 mm, and then dried at 120° C., thereby obtaining a granulated product of the spindle-shaped goethite particles successively coated with cobalt carbonate in an amount of 15 atm % (calculated as Co) based on whole Fe and with a Y compound in an amount of 12 atm % (calculated as Y) based on whole Fe. It was confirmed that the thus obtained spindle-shaped goethite particles had a Co content of 35 atm % based on whole Fe; an Al content of 8 atm % based on whole Fe; and a Y content of 12 atm % based on whole Fe.

Then, the granulated product of the spindle-shaped goethite particles successively coated with the cobalt carbonate and the Y compound was dehydrated in air at 300° C., and then heat-dehydrated at 600° C. in the same atmosphere, thereby obtaining a granulated product of spindle-shaped hematite particles.

<Production of Magnetic Metal Particles Containing Iron as a Main Component>

Then, 100 g of the thus obtained granule-shaped granulated product (average diameter: 2.6 mm) of the spindle-shaped hematite particles was charged into a reducing apparatus of a batch fixed bed type having an inner diameter of 72 mm so as to form a fixed bed having a height of 5.5 cm. Thereafter, the fixed bed was heated to 500T while passing a nitrogen gas at 500° C. through the reducing apparatus at a superficial velocity of 50 cm/s. Then, after the nitrogen gas was replaced with a hydrogen gas, the heat reduction reaction was conducted at 500° C. while passing the hydrogen gas at a superficial velocity of 50 cm/s until the dew point of exhaust gas reached −30° C., thereby producing a granulated product of magnetic metal particles containing iron as a main component.

Then, after replacing the hydrogen gas with a nitrogen gas again, the obtained particles were cooled to 60° C. and maintained at that temperature. Successively, air was mixed with the nitrogen gas, and the amount of air mixed was gradually increased until the oxygen concentration of the mixed gas reached 0.35 vol %. Under such an atmosphere, the particles were subjected to surface-oxidation treatment until the temperature thereof reached the retention temperature plus 1° C. (maximum temperature of particles: 100° C.; treating time: 2 hours), thereby forming a surface oxidation layer on the surface of the particles and obtaining a granulated product of magnetic metal particles containing iron as a main component.

It was confirmed that the thus obtained magnetic metal particles containing iron as a main component had an average major axis diameter of 0.063 μm, an aspect ratio of 5.4:1, a BET specific surface area value of 60.5 m$^2$/g, a crystallite size $D_{110}$ of 134 Å, and were spindle-shaped particles having a uniform particle size and containing no dendritic particles. In addition, it was confirmed that the magnetic metal particles containing iron as a main component had a Co content of 35 atm % based on whole Fe; an Al content of 8 atm % based on whole Fe; and a Y content of 12 atm % based on whole Fe.

Also, it was confirmed that the magnetic metal particles containing iron as a main component had a soluble Na content of 5 ppm, a soluble Ca content of 63 ppm, and a residual sulfur content of 47 ppm, and that no soluble Fe was detected from the magnetic metal particles.

As to the magnetic properties of the magnetic metal particles containing iron as a main component, the coercive force Hc thereof was 187.1 kA/m (2,350 Oe); the saturation magnetization value σs thereof was 131.8 Am$^2$/kg (131.8 emu/g); the squareness (σr/σs) thereof was 0.534; and the oxidation stability (Δσs) of saturation magnetization thereof was 5.9% (absolute value; actual measured value: −5.9%).

As to the magnetic properties of the magnetic coating film, the coercive force Hc thereof was 193.4 kA/m (2,430 Oe); the squareness (Br/Bm) thereof was 0.848; the SFD thereof was 0.416; and the oxidation stability (ΔBm) thereof was 5.8% (absolute value; actual measured value: −5.8%).

In addition, it was confirmed that the coercive force Hc of the magnetic tape was 198.1 kA/m (2,490 Oe); the squareness (Br/Bm) thereof was 0.874; the orientation degree OR thereof was 2.68; the SFD thereof was 0.388; the surface roughness Ra thereof was 3.5 nm; and the oxidation stability ΔBm thereof was 3.4% as an absolute value (actual measured value: −3.4%). As to the electromagnetic performance of the obtained magnetic tape, it was confirmed that the 10 KHz output level thereof was +4.2 dB; and the C/N level thereof was +7.2 dB.

Meanwhile, after measuring the electromagnetic performance of the obtained magnetic tape, it was confirmed that no conspicuous stains observed on the surface of the reproduction head.

Examples 2 and 6 and Comparative Examples 1 to 11

The same procedure as defined in Example 1 for production of spindle-shaped goethite particles was conducted except that the production conditions thereof were changed variously, thereby obtaining spindle-shaped goethite particles.

Essential production conditions are shown in Tables 1 and 2, and various properties of the obtained spindle-shaped goethite particles are shown in Table 3.

Meanwhile, in the column "kind" of Table 3, "A" represents inclusion of magnetite particles in goethite particles.

Further, the spindle-shaped goethite particles obtained in Comparative Example 2 were contaminated with magnetite. So, further treatments were not conducted.

Next, the same procedure as defined in Example 1 for production of spindle-shaped hematite particles was conducted except that the spindle-shaped goethite particles having various properties as shown in Table 3 were used, thereby obtaining spindle-shaped hematite particles.

Essential production conditions are shown in Table 4, and various properties of the obtained spindle-shaped hematite particles are shown in Table 5. Meanwhile, in Example 6, no heat treatment was conducted after treatment with the anti-sintering agent.

Next, the same procedure as defined in Example 1 for production of magnetic metal particles containing iron as a main component was conducted except that the spindle-shaped hematite particles having various properties as shown in Table 5 were used, thereby obtaining magnetic metal particles containing iron as a main component.

Essential production conditions and various properties of the obtained magnetic metal particles containing iron as a main component are shown in Tables 6 and 7. Meanwhile, in Example 6, after the anti-sintering treatment as shown in Table 4, the goethite particles were directly subjected to heat-reduction treatment without production of intermediate hematite particles.

Example 7

<Production of Spindle-shaped Goethite Particles>

30 liters of a mixed aqueous alkali solution containing ammonium hydrogen carbonate and aqueous ammonia in amounts of 30 mol and 49 mol (concentration of the aqueous ammonium hydroxide solution corresponds to 62 mol % (calculated as normality) based on mixed alkalis), respectively, was charged into a reaction tower equipped with a stirrer having bubble dispersing blades, and heated to 50° C. while rotating the stirrer at 400 rpm and passing a nitrogen gas at a flow rate of 60 liters/min through the reaction tower. Then, 16 liters of an aqueous ferrous sulfate solution containing 20 mol of Fe$^{2+}$ (concentration of the mixed aqueous alkali solution corresponds to 1.973 equivalents (calculated as normality) based on ferrous sulfate) was charged into the bubble tower, and the contents of the bubble tower were aged therein for 45 minutes. Thereafter, 4 liters of an aqueous cobalt sulfate solution containing 4.4 mol of Co$^{2+}$ (corresponding to 22 atm % (calculated as Co) based on whole Fe) was added to the bubble tower and the contents of the bubble tower were further aged for 3 hours. After aging, air was passed through the bubble tower at a flow rate of 1 liter/min to conduct the oxidation reaction until the oxidation percentage of $Fe^{2+}$ reached 30%.

Then, one liter of an aqueous aluminum sulfate solution containing 1.6 mol of $Al^{3+}$ (corresponding to 8 atm % (calculated as Al) based on whole Fe) was added, and the oxidation reaction was continued until completion thereof. It was confirmed that the pH value of the reaction solution upon termination of the reaction was 8.2.

The thus obtained slurry containing goethite particles was filtered using a press filter to remove the goethite particles therefrom, and the separated goethite particles were washed with aqueous ammonia whose pH value was adjusted to 10.5, and then with ion-exchanged water, thereby obtaining a press cake. It was confirmed that a filtrate obtained after the filtration contained Co in an amount of 44 ppm.

A part of the resultant press cake was dried and pulverized by ordinary methods, thereby obtaining spindle-shaped goethite particles. It was confirmed that the obtained goethite particles had an average major axis diameter of 0.084 μm, an average minor axis diameter of 0.0117 μm, an aspect ratio of 7.2:1, a BET specific surface area value of 195.4 $m^2/g$, a Co content of whole particles of 21.9 atm % based on whole Fe, and an Al content of whole particles of 8 atm % based on whole Fe. Further, it was confirmed that the Co absorption percentage (residual amount of Co/amount of Co added) was 99.5%.

<Production of Spindle-shaped Hematite Particles>

After the press cake containing the thus obtained spindle-shaped goethite particles was sufficiently dispersed in water, an aqueous cobalt acetate solution (containing Co in an amount of 20 atm % based on whole Fe) was added thereto, and the resultant dispersion was fully stirred. Then, an aqueous sodium carbonate solution was added to the dispersion while stirring so as to adjust the pH thereof to 8.8. Thereafter, an aqueous yttrium nitrate solution (containing Y in an amount of 14 atm % based on whole Fe) was added to the dispersion, and the resultant dispersion was mixed under stirring. Further, an aqueous sodium carbonate solution was added to the dispersion so as to adjust the pH value thereof to 9.3. Thereafter, the obtained dispersion was filtered using a filter press and washed with water, thereby obtaining a press cake. The obtained press cake was extrusion-molded and granulated using an extrusion-molding machine equipped with a mold plate having an orifice diameter of 3 mm, and then dried at 120° C., thereby obtaining a granulated product of the spindle-shaped goethite particles successively coated with cobalt carbonate in an amount of 20 atm % (calculated as Co) based on whole Fe and with a Y compound in an amount of 14 atm % (calculated as Y) based on whole Fe. It was confirmed that the thus obtained spindle-shaped goethite particles had a Co content of 42 atm % based on whole Fe; an Al content of 8 atm % based on whole Fe; and a Y content of 14 atm % based on whole Fe.

Then, the granulated product of the spindle-shaped goethite particles successively coated with the cobalt carbonate and the Y compound was dehydrated in air at 300° C., and then heat-dehydrated at 550° C. in the same atmosphere, thereby obtaining a granulated product of spindle-shaped hematite particles.

<Production of Magnetic Metal Particles Containing Iron as a Main Component>

Then, 100 g of the thus obtained granule-shaped granulated product (average diameter: 2.6 mm) of the spindle-shaped hematite particles was charged into a reducing apparatus of a batch fixed bed type having an inner diameter of 72 mm so as to form a fixed bed having a height of 5.5 cm. Thereafter, the fixed bed was heated to 470° C. while passing a nitrogen gas at 470° C. through the reducing apparatus at a superficial velocity of 50 cm/s. Then, after the nitrogen gas was replaced with a hydrogen gas, the heat reduction reaction was conducted at 470° C. while passing the hydrogen gas at a superficial velocity of 50 cm/s until the dew point of exhaust gas reached −30° C., thereby producing a granulated product of magnetic metal particles containing iron as a main component.

Then, after replacing the hydrogen gas with a nitrogen gas again, the obtained particles were cooled to 70° C. and maintained at that temperature. Successively, air was mixed with the nitrogen gas, and the amount of air mixed was gradually increased until the oxygen concentration of the mixed gas reached 0.35 vol %. Under such an atmosphere, the particles were subjected to surface-oxidation treatment until the temperature thereof reached the retention temperature plus 1° C. (maximum temperature of particles: 100° C.; treating time: 2 hours), thereby forming a surface oxidation layer on the surface of the particles and obtaining a granulated product of magnetic metal particles containing iron as a main component.

It was confirmed that the thus obtained magnetic metal particles containing iron as a main component had an average major axis diameter of 0.045 μm, an aspect ratio of 4.3:1, a BET specific surface area value of 70.5 $m^2/g$, a crystallite size $D_{110}$ of 107 Å, and were spindle-shaped particles having a uniform particle size and containing no dendritic particles. In addition, it was confirmed that the magnetic metal particles containing iron as a main component had a Co content of 42 atm % based on whole Fe; an Al content of 8 atm % based on whole Fe; and a Y content of 14 atm % based on whole Fe.

Also, it was confirmed that the magnetic metal particles containing iron as a main component had a soluble Na content of 9 ppm, a soluble Ca content of 44 ppm, and a residual sulfur content of 37 ppm, and that no soluble Fe was detected from the magnetic metal particles.

As to the magnetic properties of the magnetic metal particles containing iron as a main component, the coercive force Hc thereof was 173.5 kA/m (2,180 Oe); the saturation magnetization value σs thereof was 112.1 $Am^2/kg$ (112.1 emu/g); the squareness (σr/σs) thereof was 0.533; and the oxidation stability (Δσs) of saturation magnetization thereof was 6.2% (absolute value; actual measured value: −6.2%).

Further, In addition, it was confirmed that the coercive force Hc of the magnetic tape was 194.2 kA/m (2,440 Oe); the squareness (Br/Bm) thereof was 0.862; the orientation degree OR thereof was 2.62; the SFD thereof was 0.540; the surface roughness Ra thereof was 2.8 nm; and the oxidation stability ΔBm thereof was 2.9% as an absolute value (actual measured value: −2.9%). As to the electromagnetic performance of the obtained magnetic tape, it was confirmed that the 10 KHz output level thereof was +5.9 dB; and the C/N level thereof was +13.0 dB.

Meanwhile, after measuring the electromagnetic performance of the obtained magnetic tape, it was confirmed that no conspicuous stains observed on the surface of the reproduction head.

Examples 8

The same procedure as defined in Example 7 for production of spindle-shaped goethite particles was conducted except that the production conditions thereof were changed variously, thereby obtaining spindle-shaped goethite particles.

Essential production conditions are shown in Tables 1 and 2, and various properties of the obtained spindle-shaped goethite particles are shown in Table 3.

Next, the same procedure as defined in Example 7 for production of spindle-shaped hematite particles was conducted except that the spindle-shaped goethite particles having various properties as shown in Table 3 were used, thereby obtaining spindle-shaped hematite particles.

Essential production conditions are shown in Table 4, and various properties of the obtained spindle-shaped hematite particles are shown in Table 5.

Next, the same procedure as defined in Example 7 for production of magnetic metal particles containing iron as a main component was conducted except that the spindle-shaped hematite particles having various properties as shown in Table 5 were used, thereby obtaining magnetic metal particles containing iron as a main component.

Essential production conditions and various properties of the obtained magnetic metal particles containing iron as a main component are shown in Tables 6 and 7.

TABLE 1

Production of spindle-shaped goethite seed crystal particles
Mixed aqueous alkali solution

| Examples | Aqueous ammonium hydrogen carbonate solution | | Aqueous ammonium hydroxide solution | |
|---|---|---|---|---|
| | Concentration (mol/liter) | Amount used (liter) | Concentration (mol/liter) | Amount used (liter) |
| Example 2 | 1.15 | 26.0 | 15.0 | 4.0 |
| Example 3 | 1.11 | 27.0 | 15.0 | 3.0 |
| Example 4 | 1.15 | 26.0 | 15.0 | 4.0 |
| Example 5 | 1.11 | 27.0 | 15.0 | 3.0 |
| Example 6 | 1.11 | 27.0 | 15.0 | 3.0 |
| Example 7 | 1.11 | 27.0 | 16.3 | 3.0 |
| Example 8 | 1.11 | 27.0 | 15.0 | 3.0 |

Production of spindle-shaped goethite seed crystal particles

| Examples | Mixed aqueous alkali solution | Aqueous ferrous sulfate solution | |
|---|---|---|---|
| | Alkali ratio (NH$_4$OH/whole alkali) (mol %) | Concentration (mol/liter) | Amount used (liter) |
| Example 2 | 66.7 | 1.25 | 16.0 |
| Example 3 | 60.0 | 1.25 | 16.0 |
| Example 4 | 66.7 | 1.25 | 16.0 |
| Example 5 | 60.0 | 1.25 | 16.0 |
| Example 6 | 60.0 | 1.25 | 16.0 |
| Example 7 | 62.0 | 1.25 | 16.0 |
| Example 8 | 66.7 | 1.00 | 16.0 |

Production of spindle-shaped goethite seed crystal particles

| Examples | Cobalt compound | | | |
|---|---|---|---|---|
| | Equivalent ratio (—) | Amount added (Co/Fe) (atm %) | Addition timing Elapsed time after initiation of aging (min) | Temperature (° C.) |
| Example 2 | 2.25 | 20 | 25 | 50 |
| Example 3 | 1.875 | 20 | 15 | 50 |

TABLE 1-continued

| Example 4 | 2.25 | 25 | 25 | 50 |
|---|---|---|---|---|
| Example 5 | 1.875 | 20 | 25 | 45 |
| Example 6 | 1.875 | 20 | 15 | 50 |
| Example 7 | 1.973 | 22 | 45 | 50 |
| Example 8 | 2.344 | 20 | 40 | 50 |

TABLE 2

Production of spindle-shaped goethite seed crystal particles
Mixed aqueous alkali solution

| Comparative Examples | Aqueous ammonium hydrogen carbonate solution | | Aqueous ammonium hydroxide solution | |
|---|---|---|---|---|
| | Concentration (mol/liter) | Amount used (liter) | Concentration (mol/liter) | Amount used (liter) |
| Comparative Example 1 | 0.75 | 29.3 | 15.0 | 0.74 |
| Comparative Example 2 | 0.79 | 27.8 | 15.0 | 2.21 |
| Comparative Example 3 | 1.20 | 30 | — | — |
| Comparative Example 4 | 2.20 | 24.6 | 15.0 | 5.4 |
| Comparative Example 5 | 1.11 | 27.0 | 15.0 | 3.0 |
| Comparative Example 6 | 1.11 | 27.0 | 15.0 | 3.0 |
| Comparative Example 7 | 1.11 | 27.0 | 15.0 | 3.0 |
| Comparative Example 8 | 1.11 | 27.0 | 15.0 | 3.0 |
| Comparative Example 9 | 1.11 | 27.0 | 15.0 | 3.0 |
| Comparative Example 10 | 1.11 | 27.0 | 15.0 | 3.0 |
| Comparative Example 11 | 1.11 | 27.0 | 15.0 | 3.0 |

Production of spindle-shaped goethite seed crystal particles

| Comparative Examples | Mixed aqueous alkali solution | Aqueous ferrous sulfate solution | |
|---|---|---|---|
| | Alkali ratio (NH$_4$OH/whole alkali) (mol %) | Concentration (mol/liter) | Amount used (liter) |
| Comparative Example 1 | 20.0 | 1.25 | 16.0 |
| Comparative Example 2 | 90.0 | 1.25 | 16.0 |
| Comparative Example 3 | 0.0 | 1.25 | 16.0 |
| Comparative Example 4 | 60.0 | 1.25 | 16.0 |
| Comparative Example 5 | 60.0 | 1.25 | 16.0 |
| Comparative Example 6 | 60.0 | 1.25 | 16.0 |
| Comparative Example 7 | 60.0 | 1.25 | 16.0 |
| Comparative Example 8 | 60.0 | 1.25 | 16.0 |
| Comparative Example 9 | 60.0 | 1.25 | 16.0 |
| Comparative Example 10 | 60.0 | 1.25 | 16.0 |
| Comparative Example 11 | 60.0 | 1.25 | 16.0 |

TABLE 2-continued

Production of spindle-shaped goethite seed crystal particles

Cobalt compound

| Comparative Examples | Equivalent ratio (−) | Amount added (Co/Fe) (atm %) | Addition timing Elapsed time after initiation of aging (min) | Temperature (° C.) |
|---|---|---|---|---|
| Comparative Example 1 | 1.38 | 20 | 25 | 50 |
| Comparative Example 2 | 1.38 | 20 | 25 | 50 |
| Comparative Example 3 | 1.80 | 20 | 25 | 50 |
| Comparative Example 4 | 3.35 | 20 | 25 | 50 |
| Comparative Example 5 | 1.875 | 20 | 25 | 50 |
| Comparative Example 6 | 1.875 | 20 | 25 | 50 |
| Comparative Example 7 | 1.875 | 20 | 25 | 50 |
| Comparative Example 8 | 1.875 | 20 | 25 | 50 |
| Comparative Example 9 | 1.875 | 20 | 25 | 50 |
| Comparative Example 10 | 1.875 | 20 | 25 | 50 |
| Comparative Example 11 | 1.875 | 20 | 25 | 50 |

TABLE 3

Production of spindle-shaped goethite particles
Aluminum compound

| Examples | Amount added (Al/Fe) (atm %) | Addition timing (oxidation percentage of $Fe^{2+}$) (%) |
|---|---|---|
| Example 2 | 8 | 30 |
| Example 3 | 5 | 30 |
| Example 4 | 8 | 30 |
| Example 5 | 8 | 30 |
| Example 6 | 5 | 30 |
| Example 7 | 8 | 30 |
| Example 8 | 8 | 30 |

| Examples | Production of spindle-shaped goethite particles Temperature (° C.) | pH value (−) | Washing pH value of aqueous ammonia |
|---|---|---|---|
| Example 2 | 50 | 8.6 | 11.0 |
| Example 3 | 50 | 8.0 | 10.5 |
| Example 4 | 50 | 8.5 | 11.0 |
| Example 5 | 45 | 7.9 | 10.5 |
| Example 6 | 50 | 8.0 | 10.5 |
| Example 7 | 50 | 8.2 | 10.5 |
| Example 8 | 50 | 8.3 | 11.0 |

TABLE 4

Production of spindle-shaped goethite particles
Aluminum compound

| Comparative Examples | Amount added (Al/Fe) (atm %) | Addition timing (oxidation percentage of $Fe^{2+}$) (%) |
|---|---|---|
| Comparative Example 1 | 8 | 30 |
| Comparative Example 2 | 8 | 30 |
| Comparative Example 3 | 8 | 30 |
| Comparative Example 4 | 8 | 30 |
| Comparative Example 5 | 8 | 10 |
| Comparative Example 6 | 8 | 85 |
| Comparative Example 7 | 5 | 30 |
| Comparative Example 8 | 5 | 30 |
| Comparative Example 9 | 5 | 30 |
| Comparative Example 10 | 5 | 30 |
| Comparative Example 11 | 5 | 30 |

| Comparative Examples | Production of spindle-shaped goethite particles Temperature (° C.) | pH value (−) | Washing pH value of aqueous ammonia |
|---|---|---|---|
| Comparative Example 1 | 50 | 7.7 | 10.5 |
| Comparative Example 2 | 50 | 8.3 | 10.5 |
| Comparative Example 3 | 50 | 7.2 | 10.5 |
| Comparative Example 4 | 50 | 7.3 | 10.5 |
| Comparative Example 5 | 50 | 8.2 | 10.5 |
| Comparative Example 6 | 50 | 8.6 | 10.5 |
| Comparative Example 7 | 50 | 8.0 | 10.5 |
| Comparative Example 8 | 50 | 8.0 | 10.5 |
| Comparative Example 9 | 50 | 8.0 | 10.5 |
| Comparative Example 10 | 50 | 8.0 | 10.5 |
| Comparative Example 11 | 50 | 8.0 | 10.5 |

TABLE 5

Properties of goethite particles

| Examples | Kind | Particle shape | Average major axis diameter (μm) |
|---|---|---|---|
| Example 2 | Goethite | Spindle-shaped | 0.085 |
| Example 3 | Goethite | Spindle-shaped | 0.102 |
| Example 4 | Goethite | Spindle-shaped | 0.077 |
| Example 5 | Goethite | Spindle-shaped | 0.099 |
| Example 6 | Goethite | Spindle-shaped | 0.102 |
| Example 7 | Goethite | Spindle-shaped | 0.084 |
| Example 8 | Goethite | Spindle-shaped | 0.082 |

TABLE 5-continued

| | Properties of goethite particles | | |
|---|---|---|---|
| Examples | Aspect ratio (-) | BET specific surface area (m$^2$/g) | Co concentration in filtrate (ppm) |
| Example 2 | 8.2:1 | 177.9 | 63 |
| Example 3 | 9.1:1 | 190.6 | 40 |
| Example 4 | 7.1:1 | 198.1 | 51 |
| Example 5 | 8.4:1 | 193.4 | 47 |
| Example 6 | 9.1:1 | 190.6 | 40 |
| Example 7 | 7.2:1 | 195.4 | 44 |
| Example 8 | 7.5:1 | 199.0 | 35 |

| | Properties of goethite particles | | |
|---|---|---|---|
| Examples | Co content (Co/whole Fe) (atm %) | Co absorption percentage (%) | Al content (Al/whole Fe) (atm %) |
| Example 2 | 19.7 | 98.5 | 8 |
| Example 3 | 19.9 | 99.3 | 5 |
| Example 4 | 24.6 | 98.4 | 8 |
| Example 5 | 20 | 100 | 8 |
| Example 6 | 19.9 | 99.3 | 5 |
| Example 7 | 21.9 | 99.5 | 8 |
| Example 8 | 19.9 | 99.5 | 8 |

TABLE 6

| | Properties of goethite particles | | |
|---|---|---|---|
| Comparative Examples | Kind | Particle shape | Average major axis diameter (μm) |
| Comparative Example 1 | Goethite | Spindle-shaped | 0.123 |
| Comparative Example 2 | A | Spindle-shaped | — |
| Comparative Example 3 | Goethite | Spindle-shaped | 0.115 |
| Comparative Example 4 | Goethite | Spindle-shaped | 0.109 |
| Comparative Example 5 | Goethite | Spindle-shaped | 0.103 |
| Comparative Example 6 | Goethite | Spindle-shaped | 0.101 |
| Comparative Example 7 | Goethite | Spindle-shaped | 0.102 |
| Comparative Example 8 | Goethite | Spindle-shaped | 0.102 |
| Comparative Example 9 | Goethite | Spindle-shaped | 0.102 |
| Comparative Example 10 | Goethite | Spindle-shaped | 0.102 |
| Comparative Example 11 | Goethite | Spindle-shaped | 0.102 |

| | Properties of goethite particles | | |
|---|---|---|---|
| Comparative Examples | Aspect ratio (-) | BET specific surface area (m$^2$/g) | Co concentration in filtrate (ppm) |
| Comparative Example 1 | 6.1:1 | 144.4 | 39 |
| Comparative Example 2 | — | — | 1,426 |
| Comparative Example 3 | 5.9:1 | 150.9 | 41 |
| Comparative Example 4 | 5.9:1 | 153.7 | 2,588 |
| Comparative Example 5 | 6.4:1 | 171.7 | 63 |
| Comparative Example 6 | 8.7:1 | 185.8 | 59 |
| Comparative Example 7 | 9.1:1 | 190.6 | 40 |
| Comparative Example 8 | 9.1:1 | 190.6 | 40 |
| Comparative Example 9 | 9.1:1 | 190.6 | 40 |
| Comparative Example 10 | 9.1:1 | 190.6 | 40 |
| Comparative Example 11 | 9.1:1 | 190.6 | 40 |

| | Properties of goethite particles | | |
|---|---|---|---|
| Comparative Examples | Co content (Co/whole Fe) (atm %) | Co absorption percentage (%) | Al content (Al/whole Fe) (atm %) |
| Comparative Example 1 | 20 | 100 | 8 |
| Comparative Example 2 | 12 | 60 | 8 |
| Comparative Example 3 | 20 | 100 | 8 |
| Comparative Example 4 | 10 | 50 | 8 |
| Comparative Example 5 | 19.9 | 99.3 | 8 |
| Comparative Example 6 | 19.8 | 98.7 | 8 |
| Comparative Example 7 | 19.9 | 99.3 | 5 |
| Comparative Example 8 | 19.9 | 99.3 | 5 |
| Comparative Example 9 | 19.9 | 99.3 | 5 |
| Comparative Example 10 | 19.9 | 99.3 | 5 |
| Comparative Example 11 | 19.9 | 99.3 | 5 |

Note:
"A" represents inclusion of magnetite in goethite particles

TABLE 7

| | Production conditions of goethite particles coated with cobalt carbonate and rare earth compound | | | |
|---|---|---|---|---|
| | Amount of cobalt compound added (Me/Fe) | Rare earth compound Ln | | |
| Examples | (atm %) | Kind | Amount added (Ln/Fe) (atm %) | |
| Example 2 | 15 | Y | 12 | |
| Example 3 | 12 | Y | 8 | |
| Example 4 | 15 | y | 12 | |
| Example 5 | 15 | Y | 8 | |
| Example 6 | 12 | Y | 8 | |
| Example 7 | 20 | Y | 14 | |
| Example 8 | 20 | Y | 19 | |

| | Production conditions of goethite particles coated with cobalt carbonate and rare earth compound | |
|---|---|---|
| Examples | Kind of alkali | Coating order of cobalt carbonate and rare earth compound |
| Example 2 | Na$_2$CO$_3$ | Coating of cobalt carbonate → coating of rare earth compound |
| Example 3 | Na$_2$CO$_3$ | Coating of cobalt carbonate → coating of rare earth compound |

TABLE 7-continued

| Examples | | |
|---|---|---|
| Example 4 | Na₂CO₃ | Coating of cobalt carbonate → coating of rare earth compound |
| Example 5 | Na₂CO₃ | Coating of cobalt carbonate → coating of rare earth compound |
| Example 6 | Na₂CO₃ | Coating of cobalt carbonate → coating of rare earth compound |
| Example 7 | Na₂CO₃ | Coating of cobalt carbonate → coating of rare earth compound |
| Example 8 | Na₂CO₃ | Coating of cobalt carbonate → coating of rare earth compound |

Production conditions of hematite particles

| Examples | Heating temperature (° C.) | Atmosphere |
|---|---|---|
| Example 2 | 600 | In air |
| Example 3 | 600 | In air |
| Example 4 | 600 | In air |
| Example 5 | 600 | In air |
| Example 6 | — | — |
| Example 7 | 550 | In air |
| Example 8 | 500 | In air |

TABLE 8

Production conditions of goethite particles coated with cobalt carbonate and rare earth compound

| Comparative Examples | Amount of cobalt compound added (Me/Fe) (atm %) | Rare earth compound Ln Kind | Amount added (Ln/Fe) (atm %) |
|---|---|---|---|
| Comparative Example 1 | 15 | Y | 8 |
| Comparative Example 2 | — | — | — |
| Comparative Example 3 | 15 | Y | 8 |
| Comparative Example 4 | 15 | Y | 8 |
| Comparative Example 5 | 12 | Y | 8 |
| Comparative Example 6 | 12 | Y | 8 |
| Comparative Example 7 | 12 | Y | 8 |
| Comparative Example 8 | 12 | Y | 8 |
| Comparative Example 9 | 12 | Y | 8 |
| Comparative Example 10 | — | Y | 8 |
| Comparative Example 11 | 12 | — | — |

Production conditions of goethite particles coated with cobalt carbonate and rare earth compound

| Comparative Examples | Kind of alkali | Coating order of cobalt carbonate and rare earth compound |
|---|---|---|
| Comparative Example 1 | Na₂CO₃ | Coating of cobalt carbonate → coating of rare earth compound |
| Comparative Example 2 | — | — |
| Comparative Example 3 | Na₂CO₃ | Coating of cobalt carbonate → coating of rare earth compound |
| Comparative Example 4 | Na₂CO₃ | Coating of cobalt carbonate → coating of rare earth compound |
| Comparative Example 5 | Na₂CO₃ | Coating of cobalt carbonate → coating of rare earth compound |
| Comparative Example 6 | Na₂CO₃ | Coating of cobalt carbonate → coating of rare earth compound |
| Comparative Example 7 | Na₂CO₃ | Coating of rare earth compound → coating of cobalt carbonate |
| Comparative Example 8 | Na₂CO₃ | Simultaneous coating of cobalt carbonate and rare earth compound |
| Comparative Example 9 | NaOH | Coating of cobalt hydroxide → coating of rare earth compound |
| Comparative Example 10 | Na₂CO₃ | Only rare earth compound coat was formed |
| Comparative Example 11 | Na₂CO₃ | Only cobalt carbonate coat was formed |

Production conditions of hematite particles

| Comparative Examples | Heating temperature (° C.) | Atmosphere |
|---|---|---|
| Comparative Example 1 | 600 | In air |
| Comparative Example 2 | — | — |
| Comparative Example 3 | 600 | In air |
| Comparative Example 4 | 600 | In air |
| Comparative Example 5 | 600 | In air |
| Comparative Example 6 | 600 | In air |
| Comparative Example 7 | 600 | In air |
| Comparative Example 8 | 600 | In air |
| Comparative Example 9 | 600 | In air |
| Comparative Example 10 | 600 | In air |
| Comparative Example 11 | 600 | In air |

TABLE 9

Properties of hematite particles

| Examples | Kind | Particle shape | Aspect ratio (—) |
|---|---|---|---|
| Example 2 | Hematite | Spindle-shaped | 8.1:1 |
| Example 3 | Hematite | Spindle-shaped | 8.9:1 |
| Example 4 | Hematite | Spindle-shaped | 6.8:1 |
| Example 5 | Hematite | Spindle-shaped | 8.4:1 |
| Example 6 | Goethite | Spindle-shaped | — |
| Example 7 | Hematite | Spindle-shaped | 7.1:1 |
| Example 8 | Hematite | Spindle-shaped | 7.4:1 |

Properties of hematite particles

| Examples | BET specific surface area (m²/g) | Residual sulfur content (ppm) | Soluble Na (ppm) |
|---|---|---|---|
| Example 2 | 78.9 | 39 | 6 |
| Example 3 | 71.6 | 42 | 3 |
| Example 4 | 88.8 | 35 | 7 |
| Example 5 | 72.8 | 38 | 6 |
| Example 6 | — | — | — |
| Example 7 | 92.1 | 37 | 8 |
| Example 8 | 98.1 | 34 | 10 |

TABLE 9-continued

Properties of hematite particles

| Examples | Co content (Co/whole Fe) (atm %) | Al content (Al/whole Fe) (atm %) | Rare earth element content (rare earth element/whole Fe) (atm %) |
|---|---|---|---|
| Example 2 | 35 | 8 | 12 |
| Example 3 | 32 | 5 | 8 |
| Example 4 | 40 | 8 | 12 |
| Example 5 | 35 | 8 | 8 |
| Example 6 | 32 | 5 | 8 |
| Example 7 | 42 | 8 | 14 |
| Example 8 | 40 | 8 | 19 |

Note:
Data of Example 6 were analyzed values of goethite

TABLE 10

Properties of hematite particles

| Comparative Examples | Kind | Particle shape | Aspect ratio (−) |
|---|---|---|---|
| Comparative Example 1 | Hematite | Spindle-shaped | 5.3:1 |
| Comparative Example 2 | — | — | — |
| Comparative Example 3 | Hematite | Spindle-shaped | 5.0:1 |
| Comparative Example 4 | Hematite | Spindle-shaped | 5.1:1 |
| Comparative Example 5 | Hematite | Spindle-shaped | 6.1:1 |
| Comparative Example 6 | Hematite | Spindle-shaped | 6.3:1 |
| Comparative Example 7 | Hematite | Spindle-shaped | 8.0:1 |
| Comparative Example 8 | Hematite | Spindle-shaped | 7.9:1 |
| Comparative Example 9 | Hematite | Spindle-shaped | 7.7:1 |
| Comparative Example 10 | Hematite | Spindle-shaped | 7.6:1 |
| Comparative Example 11 | Hematite | Spindle-shaped | 7.5:1 |

Properties of hematite particles

| Comparative Examples | BET specific surface area (m²/g) | Residual sulfur content (ppm) | Soluble Na (ppm) |
|---|---|---|---|
| Comparative Example 1 | 60.2 | 59 | 8 |
| Comparative Example 2 | — | — | — |
| Comparative Example 3 | 58.9 | 44 | 9 |
| Comparative Example 4 | 65.8 | 48 | 6 |
| Comparative Example 5 | 63.4 | 38 | 7 |
| Comparative Example 6 | 61.2 | 33 | 8 |
| Comparative Example 7 | 59.6 | 48 | 8 |
| Comparative Example 8 | 62.3 | 45 | 6 |
| Comparative Example 9 | 54.9 | 44 | 16 |
| Comparative Example 10 | 53.5 | 47 | 7 |
| Comparative Example 11 | 54.7 | 49 | 6 |

TABLE 10-continued

Properties of hematite particles

| Comparative Examples | Co content (Co/whole Fe) (atm %) | Al content (Al/whole Fe) (atm %) | Rare earth element content (rare earth element/whole Fe) (atm %) |
|---|---|---|---|
| Comparative Example 1 | 35 | 8 | 8 |
| Comparative Example 2 | — | — | — |
| Comparative Example 3 | 32 | 8 | 8 |
| Comparative Example 4 | 32 | 8 | 8 |
| Comparative Example 5 | 32 | 8 | 8 |
| Comparative Example 6 | 31 | 8 | 8 |
| Comparative Example 7 | 32 | 5 | 8 |
| Comparative Example 8 | 32 | 5 | 8 |
| Comparative Example 9 | 32 | 5 | 8 |
| Comparative Example 10 | 20 | 5 | 8 |
| Comparative Example 11 | 32 | 5 | 0 |

TABLE 11

Properties of magnetic metal particles containing iron as a main component

| Examples | Reducing temperature (° C.) | Average major axis diameter (μm) | Aspect ratio (−) |
|---|---|---|---|
| Example 2 | 500 | 0.048 | 4.3:1 |
| Example 3 | 550 | 0.072 | 6.1:1 |
| Example 4 | 500 | 0.039 | 3.9:1 |
| Example 5 | 500 | 0.073 | 6.2:1 |
| Example 6 | 500 | 0.071 | 5.9:1 |
| Example 7 | 470 | 0.045 | 4.3:1 |
| Example 8 | 490 | 0.044 | 4.4:1 |

Properties of magnetic metal particles containing iron as a main component

| Examples | BET specific surface areas (m²/g) | Crystallite size $D_{110}$ (Å) | Residual sulfur content (ppm) |
|---|---|---|---|
| Example 2 | 65.7 | 122 | 43 |
| Example 3 | 55.5 | 136 | 34 |
| Example 4 | 72.8 | 116 | 45 |
| Example 5 | 58.8 | 135 | 39 |
| Example 6 | 53.4 | 137 | 36 |
| Example 7 | 70.5 | 107 | 37 |
| Example 8 | 72.5 | 105 | 48 |

Properties of magnetic metal particles containing iron as a main component

| Examples | Co content (Co/whole Fe) (atm %) | Al content (Al/whole Fe) (atm %) | Rare earth element content (rare earth element/whole Fe) (atm %) |
|---|---|---|---|
| Example 2 | 35 | 8 | 12 |
| Example 3 | 32 | 5 | 8 |
| Example 4 | 40 | 8 | 12 |

TABLE 11-continued

| Example 5 | 35 | 8 | 8 |
| Example 6 | 32 | 5 | 8 |
| Example 7 | 42 | 8 | 14 |
| Example 8 | 40 | 8 | 19 |

| | Properties of magnetic metal particles containing iron as a main component | |
|---|---|---|
| Examples | Soluble Na content (ppm) | Soluble Ca content (ppm) |
| Example 2 | 7 | 34 |
| Example 3 | 2 | 39 |
| Example 4 | 8 | 59 |
| Example 5 | 3 | 60 |
| Example 6 | 3 | 41 |
| Example 7 | 9 | 44 |
| Example 8 | 10 | 38 |

TABLE 12

| | | Properties of magnetic metal particles containing iron as a main component | |
|---|---|---|---|
| Comparative Examples | Reducing temperature (°C.) | Average major axis diameter (μm) | Aspect ratio (–) |
| Comparative Example 1 | 500 | 0.085 | 4.5:1 |
| Comparative Example 2 | — | — | — |
| Comparative Example 3 | 500 | 0.083 | 4.1:1 |
| Comparative Example 4 | 500 | 0.091 | 4.3:1 |
| Comparative Example 5 | 500 | 0.095 | 4.8:1 |
| Comparative Example 6 | 500 | 0.089 | 4.6:1 |
| Comparative Example 7 | 550 | 0.076 | 4.7:1 |
| Comparative Example 8 | 550 | 0.080 | 4.8:1 |
| Comparative Example 9 | 500 | 0.070 | 4.9:1 |
| Comparative Example 10 | 550 | 0.066 | 3.9:1 |
| Comparative Example 11 | 550 | 0.067 | 4.1:1 |

| | Properties of magnetic metal particles containing iron as a main component | | |
|---|---|---|---|
| Comparative Examples | BET specific surface area (m$^2$/g) | Crystallite size $D_{110}$ (Å) | Residual sulfur content (ppm) |
| Comparative Example 1 | 41.5 | 162 | 87 |
| Comparative Example 2 | — | — | — |
| Comparative Example 3 | 41.2 | 161 | 78 |
| Comparative Example 4 | 43.8 | 157 | 67 |
| Comparative Example 5 | 46.6 | 160 | 65 |
| Comparative Example 6 | 40.3 | 165 | 66 |
| Comparative Example 7 | 47.8 | 151 | 49 |
| Comparative Example 8 | 43.5 | 159 | 51 |
| Comparative Example 9 | 47.2 | 144 | 49 |
| Comparative Example 10 | 43.1 | 157 | 48 |
| Comparative Example 11 | 46.4 | 149 | 53 |

| | Properties of magnetic metal particles containing iron as a main component | | |
|---|---|---|---|
| Comparative Examples | Co content (Co/whole Fe) (atm %) | Al content (Al/whole Fe) (atm %) | Rare earth element content (rare earth element/whole Fe) (atm %) |
| Comparative Example 1 | 35 | 8 | 8 |
| Comparative Example 2 | — | — | — |
| Comparative Example 3 | 35 | 8 | 8 |
| Comparative Example 4 | 35 | 8 | 8 |
| Comparative Example 5 | 32 | 8 | 8 |
| Comparative Example 6 | 32 | 8 | 8 |
| Comparative Example 7 | 32 | 5 | 8 |
| Comparative Example 8 | 32 | 5 | 8 |
| Comparative Example 9 | 32 | 5 | 8 |
| Comparative Example 10 | 20 | 5 | 8 |
| Comparative Example 11 | 32 | 5 | 0 |

| | Properties of magnetic metal particles containing iron as a main component | |
|---|---|---|
| Comparative Examples | Soluble Na content (ppm) | Soluble Ca content (ppm) |
| Comparative Example 1 | 15 | 89 |
| Comparative Example 2 | — | — |
| Comparative Example 3 | 14 | 78 |
| Comparative Example 4 | 16 | 88 |
| Comparative Example 5 | 17 | 69 |
| Comparative Example 6 | 14 | 112 |
| Comparative Example 7 | 9 | 88 |
| Comparative Example 8 | 12 | 82 |
| Comparative Example 9 | 17 | 79 |
| Comparative Example 10 | 15 | 77 |
| Comparative Example 11 | 18 | 83 |

TABLE 13

| | Magnetic properties of magnetic metal particles containing iron as a main component | | | |
|---|---|---|---|---|
| | Coercive force (Hc) | | Saturation magnetization value (σs) | |
| Examples | (kA/m) | (Oe) | (Am$^2$/kg) | (emu/g) |
| Example 2 | 178.0 | 2,237 | 125.2 | 125.2 |
| Example 3 | 200.2 | 2,516 | 132.5 | 132.5 |

TABLE 13-continued

| Examples | | | | |
|---|---|---|---|---|
| Example 4 | 167.5 | 2,105 | 120.3 | 120.3 |
| Example 5 | 190.2 | 2,390 | 131.2 | 131.2 |
| Example 6 | 200.7 | 2,522 | 132.9 | 132.9 |
| Example 7 | 173.5 | 2,180 | 112.1 | 112.1 |
| Example 8 | 177.5 | 2,230 | 108.6 | 108.6 |

| | Magnetic properties of magnetic metal particles containing iron as a main component | | Sheet properties Coercive force (Hc) | |
|---|---|---|---|---|
| | Squareness | Oxidation stability ($\Delta \sigma s$) | | |
| Examples | (−) | (%) | (kA/m) | (Oe) |
| Example 2 | 0.531 | 7.3 | 186.9 | 2,348 |
| Example 3 | 0.542 | 5.5 | 206.8 | 2,599 |
| Example 4 | 0.528 | 7.8 | 176.0 | 2,211 |
| Example 5 | 0.541 | 5.9 | 195.5 | 2,457 |
| Example 6 | 0.540 | 5.6 | 206.7 | 2,597 |
| Example 7 | 0.533 | 6.2 | 188.6 | 2.370 |
| Example 8 | 0.538 | 6.5 | 193.4 | 2.430 |

| | Sheet properties | | |
|---|---|---|---|
| Examples | Squareness (−) | SFD (−) | Oxidation stability ($\Delta Bm$) (%) |
| Example 2 | 0.821 | 0.432 | 7.2 |
| Example 3 | 0.857 | 0.393 | 5.5 |
| Example 4 | 0.820 | 0.467 | 7.7 |
| Example 5 | 0.851 | 0.411 | 5.6 |
| Example 6 | 0.841 | 0.455 | 5.8 |
| Example 7 | 0.830 | 0.570 | 3.5 |
| Example 8 | 0.835 | 0.525 | 4.3 |

TABLE 14

| | Magnetic properties of magnetic metal particles containing iron as a main component | | | |
|---|---|---|---|---|
| | Coercive force (Hc) | | Saturation magnetization value ($\sigma s$) | |
| Comparative Examples | (kA/m) | (Oe) | (Am²/kg) | (emu/g) |
| Comparative Example 1 | 147.5 | 1,853 | 155.5 | 155.5 |
| Comparative Example 2 | — | — | — | — |
| Comparative Example 3 | 144.5 | 1,816 | 154.9 | 154.9 |
| Comparative Example 4 | 154.6 | 1,943 | 154.2 | 154.2 |
| Comparative Example 5 | 149.2 | 1,875 | 156.1 | 156.1 |
| Comparative Example 6 | 143.2 | 1,799 | 155.9 | 155.9 |
| Comparative Example 7 | 148.5 | 1,866 | 155.6 | 155.6 |
| Comparative Example 8 | 146.5 | 1,841 | 155.8 | 155.8 |
| Comparative Example 9 | 143.2 | 1,799 | 156.3 | 156.3 |
| Comparative Example 10 | 135.4 | 1,701 | 141.4 | 141.4 |
| Comparative Example 11 | 137.9 | 1,733 | 155.2 | 155.2 |

| | Magnetic properties of magnetic metal particles containing iron as a main component | | Sheet properties Coercive force (Hc) | |
|---|---|---|---|---|
| | Squareness | Oxidation stability ($\Delta \sigma s$) | | |
| Comparative Examples | (−) | (%) | (kA/m) | (Oe) |
| Comparative Example 1 | 0.509 | 12.1 | 152.2 | 1,912 |
| Comparative Example 2 | — | — | — | — |
| Comparative Example 3 | 0.501 | 13.3 | 149.5 | 1,879 |
| Comparative Example 4 | 0.508 | 14.6 | 159.1 | 1,999 |
| Comparative Example 5 | 0.505 | 14.1 | 154.1 | 1,936 |
| Comparative Example 6 | 0.503 | 15.5 | 146.7 | 1,844 |
| Comparative Example 7 | 0.508 | 10.7 | 155.9 | 1,959 |
| Comparative Example 8 | 0.504 | 11.8 | 155.7 | 1,957 |
| Comparative Example 9 | 0.501 | 13.9 | 147.8 | 1,857 |
| Comparative Example 10 | 0.499 | 19.9 | 138.7 | 1,743 |
| Comparative Example 11 | 0.500 | 13.8 | 140.5 | 1,766 |

| | Sheet properties | | |
|---|---|---|---|
| Comparative Examples | Squareness (−) | SFD (−) | Oxidation stability ($\Delta Bm$) (%) |
| Comparative Example 1 | 0.777 | 0.535 | 11.9 |
| Comparative Example 2 | — | — | — |
| Comparative Example 3 | 0.765 | 0.571 | 12.8 |
| Comparative Example 4 | 0.790 | 0.541 | 14.3 |
| Comparative Example 5 | 0.786 | 0.523 | 14.0 |
| Comparative Example 6 | 0.763 | 0.594 | 15.2 |
| Comparative Example 7 | 0.790 | 0.544 | 10.5 |
| Comparative Example 8 | 0.793 | 0.533 | 10.9 |
| Comparative Example 9 | 0.788 | 0.556 | 14.5 |
| Comparative Example 10 | 0.766 | 0.616 | 22.1 |
| Comparative Example 11 | 0.768 | 0.599 | 15.1 |

TABLE 15

| | Properties of magnetic tape | | | |
|---|---|---|---|---|
| | Coercive force value (Hc) | | | Orientation degree |
| Examples and Comparative Examples | kA/m | Oe | Squareness (−) | (−) |
| Example 1 | 198.1 | 2,490 | 0.874 | 2.68 |
| Example 7 | 194.2 | 2,440 | 0.862 | 2.62 |
| Example 8 | 198.5 | 2,495 | 0.868 | 2.59 |

TABLE 15-continued

| Comparative Example 1 | 158.3 | 1,989 | 0.818 | 2.49 |

| Examples and Comparative Examples | Properties of magnetic tape | | |
| --- | --- | --- | --- |
| | SFD (−) | Surface roughness (Ra) (nm) | Oxidation stability (ΔBm) (%) |
| Example 1 | 0.388 | 3.5 | 3.4 |
| Example 7 | 0.540 | 2.8 | 2.9 |
| Example 8 | 0.495 | 2.7 | 3.0 |
| Comparative Example 1 | 0.520 | 4.1 | 7.0 |

| Examples and Comparative Examples | Electromagnetic performance | |
| --- | --- | --- |
| | Output (dB) | C/N (dB) |
| Example 1 | +4.2 | +7.2 |
| Example 7 | +5.9 | +13.0 |
| Example 8 | +6.3 | +14.0 |
| Comparative Example 1 | 0.0 | 0.0 |

What is claimed is:

1. Magnetic metal particles containing iron as a main component, comprising cobalt in an amount of 20 to 50 atm %, calculated as Co, based on whole Fe, aluminum in an amount of 3 to 15 atm %, calculated as Al, based on whole Fe and a rare earth element in an amount of 3 to 20 atm %, calculated as rare earth element, based on whole Fe, and having an average major axis diameter of 0.02 to 0.065 μm, a crystallite size $D_{110}$ of 90 to 150 Å, a coercive force of 159.2 to 222.9 kA/m (2,000 to 2,800 Oe), a soluble Na content of not more than 20 ppm, a soluble Ca content of not more than 100 ppm, a sulfur content of not more than 60 ppm, and an oxidation stability Δσs of not more than 8%.

2. Magnetic metal particles according to claim 1, which have an aspect ratio of not less than 3:1, and a BET specific surface area value of 40 to 80 m²/g.

3. Magnetic metal particles according to claim 1, which have a saturation magnetization value σs of 90 to 160 Am²/kg (90 to 160 emu/g), and a squareness (σr/σs) of 0.51 to 0.55.

4. Magnetic metal particles according to claim 1, wherein the average major axis diameter is from 0.02 to less than 0.05 μm.

5. Magnetic metal particles according to claim 1, wherein the average major axis diameter is 0.02 to 0.048 μm.

6. Magnetic metal particles containing iron as a main component, comprising cobalt in an amount of 20 to 50 atm %, calculated as Co, based on whole Fe, aluminum in an amount of 3 to 15 atm %, calculated as Al, based on whole Fe and a rare earth element in an amount of 3 to 20 atm %, calculated as rare earth element, based on whole Fe, and having an average major axis diameter of from 0.02 to less than 0.05 μm, a crystallite size $D_{110}$ of 90 to 150 Å, a coercive force of 159.2 to 222.9 kA/m (2,000 to 2,800 Oe), a soluble Na content of not more than 20 ppm, a soluble Ca content of not more than 100 ppm, a sulfur content of not more than 60 ppm, and an oxidation stability Δσs of not more than 8%.

7. Magnetic metal particles containing iron as a main component, comprising cobalt in an amount of 20 to 50 atm %, calculated as Co, based on whole Fe, aluminum in an amount of 3 to 15 atm %, calculated as Al, based on whole Fe, and a rare earth element in an amount of 3 to 20 atm %, calculated as rare earth element, based on whole Fe, and having an average major axis diameter of from 0.02 to less than 0.05 μm, a coercive force of 159.2 to 222.9 kA/m (2,000 to 2,800 Oe), a soluble Na content of not more than 20 ppm, a soluble Ca content of not more than 100 ppm, a sulfur content of not more than 60 ppm, an oxidation stability Δσs of not more than 8%, an aspect ratio of not less than 3:1, and a crystallite size $D_{110}$ of 90 to 150 Å.

8. Magnetic metal particles according to claim 1, wherein the magnetic metal particles containing iron as a main component are produced by heat-reducing either goethite particles containing aluminum and cobalt, which have a cobalt carbonate coat formed on surface thereof and a rare earth compound coat formed on surface of the cobalt carbonate coat, or hematite particles obtained by heat-treating the goethite particles.

9. Magnetic metal particles according to claim 8, wherein the goethite particles contain aluminum in an amount of 3 to 15 atm %, calculated as Al, based on whole Fe and cobalt in an amount of 10 to 35 atm %, calculated as Co, based on whole Fe; and have a cobalt carbonate coat formed on surface thereof in an amount of 10 to 25 atm %, calculated as Co, based on whole Fe and a rare earth compound coat formed on surface of the cobalt carbonate coat in an amount of 3 to 20 atm %, calculated as rare earth element, based on whole Fe.

10. Magnetic metal particles containing iron as a main component, comprising cobalt in an amount of 20 to 50 atm %, calculated as Co, based on whole Fe, aluminum in an amount of 3 to 15 atm %, calculated as Al, based on whole Fe, and a rare earth element in an amount of 3 to 20 atm %, calculated as rare earth element, based on whole Fe, and having an average major axis diameter of from 0.02 to less than 0.05 μm, a coercive force of 159.2 to 222.9 kA/m (2,000 to 2,800 Oe), a soluble Na content of not more than 20 ppm, a soluble Ca content of not more than 100 ppm, a sulfur content of not more than 20 ppm, an oxidation stability Δσs of not more than 8%, an aspect ratio of not less than 3:1, and a crystallite size $D_{110}$ of 90 to 150 Å, and produced by heat-reducing either goethite particles containing aluminum in an amount of 3 to 15 atm %, calculated as Al, based on whole Fe and cobalt in an amount of 10 to 35 atm %, calculated as Co, based on whole Fe which have a cobalt carbonate coat formed on surface thereof in an amount of 10 to 25 atm %, calculated as Co, based on whole Fe, and a rare earth compound coat formed on surface of the cobalt carbonate coat in an amount of 3 to 20 atm %, calculated as rare earth element, based on whole Fe, or hematite particles obtained by heat-treating the goethite particles.

11. A process for producing magnetic metal particles containing iron as a main component, comprising cobalt in an amount of 20 to 50 atm %, calculated as Co, based on whole Fe, aluminum in an amount of 3 to 15 atm %, calculated as Al, based on whole Fe and a rare earth element in an amount of 3 to 20 atm %, calculated as rare earth element, based on whole Fe, and having an average major axis diameter of 0.02 to 0.08 μm, a coercive force of 159.2 to 222.9 kA/m (2,000 to 2,800 Oe), a soluble Na content of not more than 30 ppm, a soluble Ca content of not more than 100 ppm, and an oxidation stability Δσs of not more than 8%, which process comprises:

reacting an aqueous ferrous sulfate solution with a mixed aqueous alkali solution composed of an aqueous ammonium hydrogen carbonate solution in an amount of 1.7 to 3.0 equivalents based on equivalent of the aqueous ferrous sulfate solution and an aqueous ammonium hydroxide solution in an amount of 55 to 85 mol % based on the mixed aqueous alkali solution, to obtain a water suspension containing a ferrous-containing precipitate;

aging the water suspension containing the ferrous-containing precipitate in a non-oxidative atmosphere;

adding a Co compound in an amount of 10 to 35 atm %, calculated as Co, based on whole Fe, to the water suspension containing the ferrous-containing precipitate during the aging;

passing an oxygen-containing gas through the water suspension containing the ferrous-containing precipitate to conduct an oxidation reaction thereof until 20 to 80% of whole $Fe^{2+}$ is oxidized, to produce goethite seed crystal particles;

upon growing a goethite layer on surface of the goethite seed crystal particles by passing an oxygen-containing gas through the water suspension containing the goethite seed crystal particles and the ferrous-containing precipitate, adding an aluminum compound in an amount of 3 to 15 atm %, calculated as Al, based on whole Fe, to the water suspension containing the goethite seed crystal particles and the ferrous-containing precipitate to adjust a pH value of the water suspension to less than 9.0, thereby producing goethite particles;

after filtering out the thus produced goethite particles from the water suspension, washing the goethite particles with aqueous ammonia having a pH value of 9.5 to 11.5 to obtain goethite particles;

adding a cobalt compound and alkali carbonate to a water dispersion containing the goethite particles to form a cobalt carbonate coat in an amount of 10 to 25 atm %, calculated as Co, based on whole Fe, on surface of the goethite particles;

adding a rare earth compound to the water suspension to form a rare earth compound coat in an amount of 3 to 20 atm %, calculated as rare earth element, based on whole Fe, on surface of the cobalt carbonate coat; and heat-reducing either the surface-coated goethite particles or hematite particles obtained by heat-treating the surface-coated goethite particles at a temperature of 400 to 750° C. in a non-reducing atmosphere, at a temperature of 350 to 700° C. in a reducing atmosphere.

12. A magnetic recording medium having a surface roughness Ra of not more than 5 nm and an oxidation stability ΔBm of less than 5%, comprising:

a non-magnetic base film; and a magnetic recording layer formed on the non-magnetic base film, comprising a binder resin and magnetic metal particles containing iron as a main component, comprising cobalt in an amount of 20 to 50 atm %, calculated as Co, based on whole Fe, aluminum in an amount of 3 to 15 atm %, calculated as Al, based on whole Fe and a rare earth element in an amount of 3 to 20 atm %, calculated as rare earth element, based on whole Fe, and having an average major axis diameter of 0.02 to 0.065 µm, a crystallite size $D_{110}$ of 90 to 150 Å, a coercive force of 159.2 to 222.9 kA/m (2,000 to 2,800 Oe), a soluble Na content of not more than 20 ppm, a soluble Ca content of not more than 100 ppm, a sulfur content of not more than 60 ppm, and an oxidation stability Δσs of not more than 8%.

13. A magnetic recording medium according to claim 12, wherein the average major axis diameter of the magnetic metal particles containing iron as a main component is from 0.02 to less than 0.05 µm.

14. A magnetic recording medium according to claim 12, wherein the average major axis diameter of the magnetic metal particles containing iron as a main component is 0.02 to 0.048 µm.

15. A magnetic recording medium having a surface roughness Ra of not more than 5 nm and an oxidation stability ΔBm of less than 5%, comprising:

a non-magnetic base film; and a magnetic recording layer formed on the non-magnetic base film, comprising a binder resin and magnetic metal particles containing iron as a main component, comprising cobalt in an amount of 20 to 50 atm %, calculated as Co, based on whole Fe, aluminum in an amount of 3 to 15 atm %, calculated as Al, based on whole Fe and a rare earth element in an amount of 3 to 20 atm %, calculated as rare earth element, based on whole Fe, and having an average major axis diameter of from 0.02 to less than 0.05 µm, a crystallite size $D_{110}$ of 90 to 150 Å, a coercive force of 159.2 to 222.9 kA/m (2,000 to 2,800 Oe), a soluble Na content of not more than 20 ppm, a soluble Ca content of not more than 100 ppm, a sulfur content of not more than 60 ppm, and an oxidation stability Δσs of not more than 8%.

* * * * *